United States Patent

[11] 3,627,997

[72] Inventors: Ronald L. Samuels, Palos Verdes Peninsula; William Pennington, Jr., Los Angeles; Charles L. Mueller, Harrisburg; Wallace M. Porter, Redondo Beach, all of Calif.
[21] Appl. No. 876,395
[22] Filed Nov. 13, 1969
[45] Patented Dec. 14, 1971
[73] Assignee TRW Inc. Redondo Beach, Calif.

[54] TURBINE VANE PREDICTION AND CLASSIFICATION GAGE AND GAGING METHOD
22 Claims, 20 Drawing Figs.

[52] U.S. Cl. .................................. 235/151.3, 209/82, 235/151.13, 33/174 C
[51] Int. Cl. .................................. G06f 15/46
[50] Field of Search ........................ 235/151, 151.13, 151.21, 151.3, 151.31, 151.1, 151.32; 73/228–231; 29/156.8; 33/168, 173; 72/11, 16; 209/82, 88; 340/146.2

[56] References Cited
UNITED STATES PATENTS
3,147,370  9/1964  Lowman .................. 235/151.13
3,226,967  1/1966  Paille et al. .............. 29/156.8 X Primary Examiner—Eugene G. Botz
Assistant Examiner—Jerry Smith
Attorneys—Daniel T. Anderson, Donald R. Nyhagen and Jerry A. Dinardo ABSTRACT: An instrument and method for prediction and classification gaging of production turbine vanes without distortion of the vanes. In its prediction-gaging mode, the instrument gages selected airfoil dimensions of a production turbine vane and master and provides a figure of merit readout representing the difference between the effective class values of the master and vane resulting from the difference, if any, in their corresponding airfoil dimensions. This figure of merit is converted to an angle at which the class surface of the vane must be machined to provide the vane with a selected class value. In its classification-gaging mode, the instrument gages the selected airfoil dimensions and the class face angle of the machined vane and provides a readout representing the actual class value of the machined vane. The airfoil dimensions and class surface are gaged with electrical transducer in such a way that there is no distortion of the master or vane.

PATENTED DEC 14 1971 3,627,997

Charles L. Mueller
Ronald L. Samuels
Wallace M. Porter
William Pennington Jr.
*INVENTORS*

BY
Donald L. Nyhagen
ATTORNEY

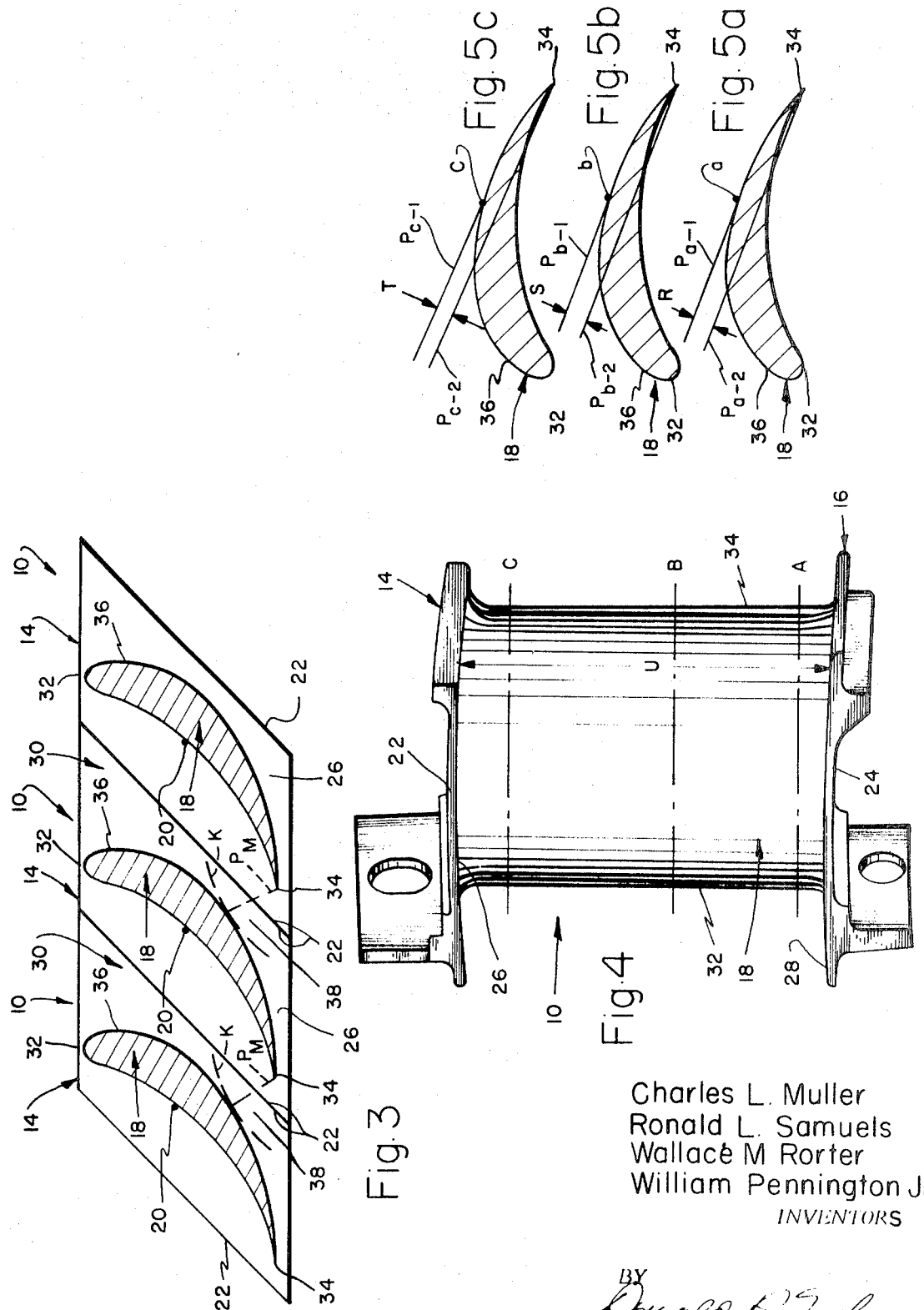

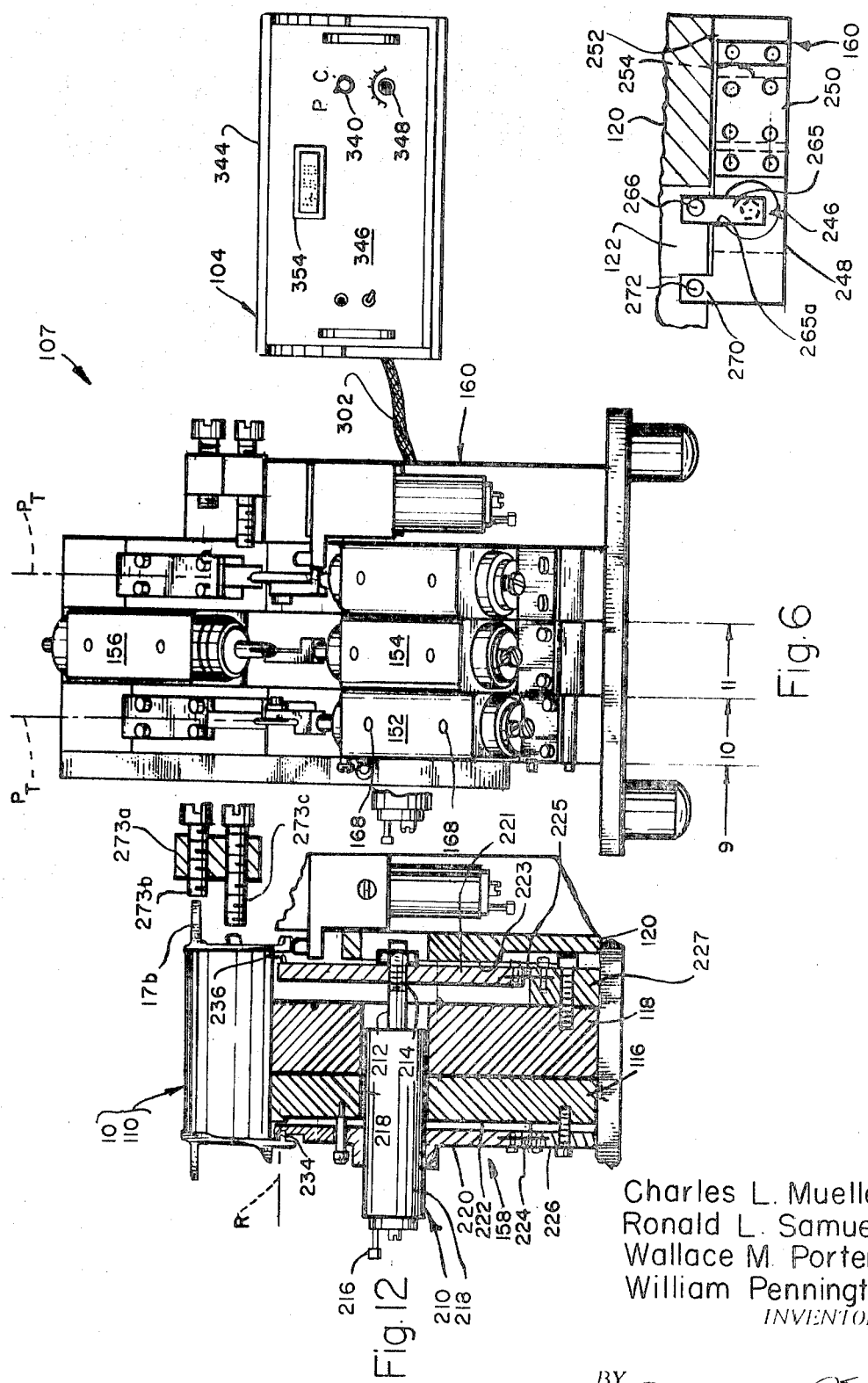

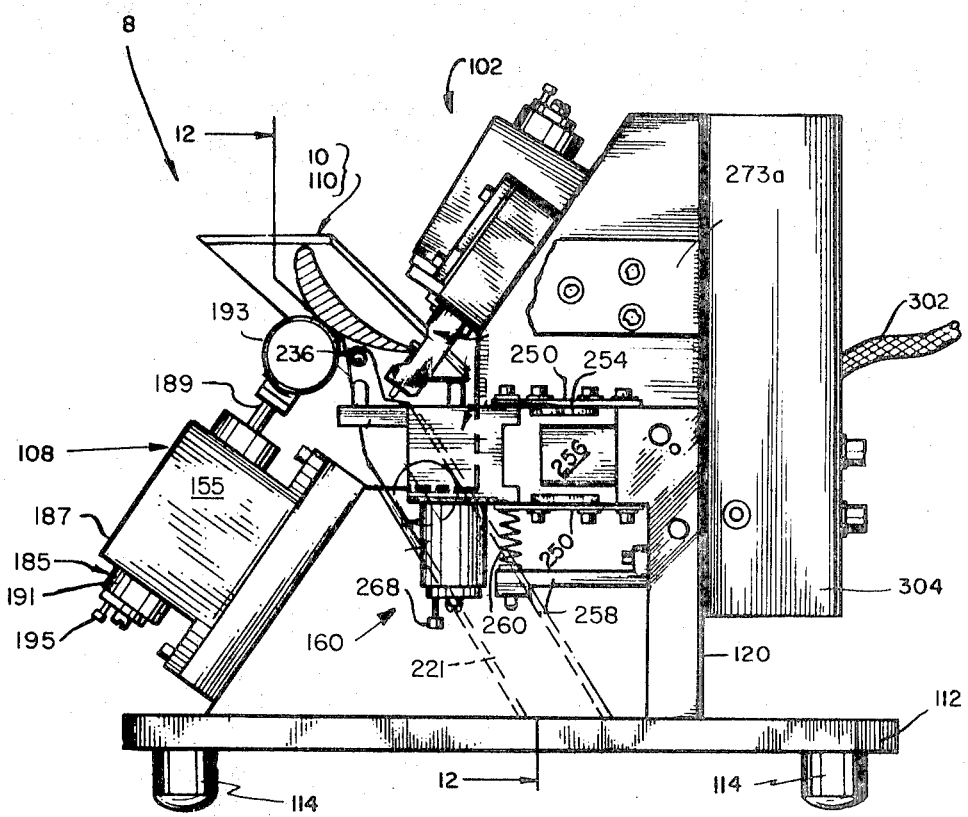
Fig. 7
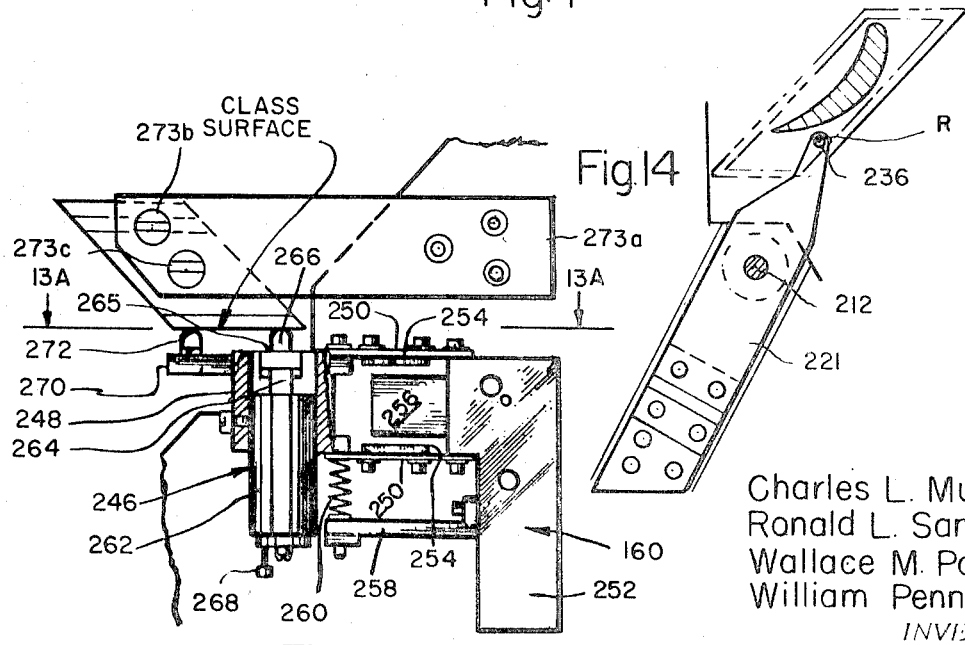
Fig. 13
Fig. 14
Charles L. Mueller
Ronald L. Samuels
Wallace M. Porter
William Pennington Jr.
INVENTORS
ATTORNEY Charles L. Mueller
Ronald L. Samuels
Wallace M. Porter
William Pennington Jr.
INVENTORS BY
Donald R. Nyhagen
ATTORNEY Charles L. Mueller
Ronald L. Samuels
Wallace M. Porter
William Pennington Jr.
INVENTORS

ATTORNEY

TURBINE VANE PREDICTION AND CLASSIFICATION GAGE AND GAGING METHOD

BACKGROUND OF THE INVENTION

1. Field of the Invention

This invention relates generally to turbines and more particularly to a turbine vane prediction and classification-gaging instrument and method.

The invention has primary application to and will be described in connection with gaging of vanes for jet aircraft engines. However, the present instrument may be utilized for gaging other types of turbine vanes and thus should not be regarded as limited in application to the gaging of jet engine turbine vanes.

2. Prior Art

Jet aircraft engines have a final stage nozzle ring composed of a set of stationary turbine vanes each having tip and root buttresses and an intervening airfoil section. These vanes are assembled side-by-side in an annular configuration. One edge surface of the tip buttress of each vane serves as a reference surface and is termed a class surface. Each pair of adjacent vanes defines an intervening flow passage having an effective minimum flow area, commonly referred to as an exit or throat area, measured within a plane of minimum spacing between the trailing edge of one vane and the opposing convex airfoil surface of the adjacent vane. The nozzle ring as a whole has a total effective flow area equal to the sum of the several intervane throat areas. According to conventional design procedure, the turbine designer specifies the vane airfoil shape, the nominal airfoil angle, and the nozzle ring flow area for a particular jet engine design. After construction, each jet engine is individually tested and tuned for optimum performance by adjusting the nozzle ring flow area.

Adjustment of the nozzle ring flow area is accomplished, in effect, by varying the airfoil angles and hence throat areas of the vanes. Thus, rotating the vane airfoils in one direction about their so-called stacking axes reduces the throat areas and hence the total effective nozzle ring flow area. Rotating the airfoils in the opposite direction increases throat area and hence total flow area. As is well known by those versed in the art, nozzle ring flow area is thus adjusted, not by physically rotating the vanes, but rather by selecting vanes whose class surfaces are machined at different angles relative to their airfoils such as to orient the latter at different angles relative to the plane of the nozzle ring. When assembling a set of turbine vanes into a nozzle ring, the vanes are selected or matched on the basis of their angular relation between their machined class surfaces and their airfoil sections, in a manner such as to provide the resulting nozzle ring with the desired flow area.

From the above discussion, it will be understood that a typical turbine vane may be installed in a nozzle ring in a range of angular positions to achieve the desired aerodynamic and thermodynamic results in the completed jet engine. The different airfoil angles at which the vane may be thus installed and their related throat areas are designated as classes. More accurately, the class designation of a turbine vane represents the throat or exit area of the flow passage define by the vane and a second vane of the same class when assembled on a specified center spacing. The airfoil angle or class which provides the throat area used in the theoretical turbine desing is designated as the basic class.

According to common turbine-vane-manufacturing procedure, a quantity of turbine vanes of the same basic vane configuration are cast with the basic class angle. The full range of vane classes are then fabricated from these basic casting by machining their class surfaces to the proper angles.

This manufacturing procedure presents one problem with which the present invention is particularly concerned. The problem referred to resides in the fact that while production turbine vanes may be cast with a relatively high degree of accuracy and precision, nevertheless, they cannot be cast to the exact dimensions used in the theoretical turbine design. In other words, production turbine vanes almost always exhibit some deviation in shape and/or size relative to the basic design vane. Typical deviations are oversize or undersize foil thickness and/or length, or a twist in the airfoil section. Each of these deviations alters the effective or so-called blocked area of vane and hence both its throat area and the total nozzle ring flow area in which the vane is installed and must be taken into account in the vane classification process.

Thus, consider two perfect vanes of given class, i.e. vanes whose dimensions conform exactly to the nominal vane dimensions used in the theoretical design, assembled on specified centers. These vanes define an intervening class throat area measured in the plane of minimum spacing between the vane airfoils, which is the plane containing the trailing edge of one airfoil and intersecting the confronting convex airfoil surface of the opposing vane along a line passing through the points of tangency of the latter surface with arcs generated about spaced points on the trailing edge. The throat between the vanes is bounded along two sides by the trailing edge and convex airfoil surface and along its remaining two sides by the confronting inner shoulder faces of the vane root and tip buttresses.

Assume now that the perfect vanes are replaced by production vanes. Any deviation in the shape and/or size of the airfoil of either production vane from those of the perfect vanes increases or decreases, depending upon the type of deviation, the effective cross-sectional area, commonly referred to as blocked area, of the vane and hence the intervane throat area. For example, oversize airfoil thickness reduces the throat area as may twisting of the airfoil section. In order to provide the production vanes with the same throat area and hence class value as the perfect vanes, it is necessary to vary the airfoil angle of one or both production vanes in the proper direction to increase or decrease the throat area, as the case may be, by the correct amount to just compensate for the loss or gain of throat area resulting from the production vane deformities. This, in turn, requires accurate measurement or gaging of the production vanes to determine their dimensional deviations from the nominal vane dimensions used in the theoretical design, machining of the class surfaces of the production vanes to the proper angle to compensate for the deviations, and regaging of the machined vanes to determine their true class value.

This procedure of gaging turbine vanes for this purpose is referred to as prediction and classification gaging. Briefly, the first step of this procedure, known as prediction gaging, involves comparison of selected airfoil dimensions of a production vane with those of a perfect basic class vane, or master as it is called, to obtain a figure of merit representing the difference in class values of the production vane and master resulting from the differences, if any, in their corresponding airfoil dimensions. This figure of merit is then converted to an angle at which the class surface of the production vane must be machined to provide the finished production vane with a selected class value which may be the same as that of the master or some other selected class value. The second step of the procedure involves machining the class surface of the production vane to the angle determined by the prediction-gaging step. The third and final step of the procedure, referred to as classification gaging, involves comparison of the selected dimensions and the angle of the machined class surfaces of the production vane and master to obtain the actual or true class value of the production vane.

Instruments, known as prediction and classification gages, have been devised for performing the prediction and classification steps of the gaging procedure outlined above. However, these existing gages suffer from certain deficiencies which this invention overcomes. All of these deficiencies need not be discussed in detail in this disclosure. Suffice it to say, that a particularly serious defect of the existing gages resides in the fact that they subject the turbine vanes to clamping forces which distort the vanes and thus introduce error into the gaging process. Another drawback of the existing gages involves the measurement of the effective airfoil length, that is the spacing between the vane root and tip buttresses. Heretofore, this airfoil length measurement has been obtained with a separate gaging instrument, thus complicating and prolonging the overall prediction and classification procedure.

SUMMARY OF THE INVENTION

The present invention provides an improved turbine vane prediction and classification gaging instrument and method which cures the above and other defects of the existing gages. The present gage comprises two major components, to wit, a mechanical gaging fixture and a computer. The gaging fixture receives, in succession, a master vane and a production vane to be gaged. The fixture has electrical gaging means for producing electrical gaging signals representing deviations or deltas between corresponding selected critical dimensions of the master and vane. The computer receives these gaging signals from the fixture, and, in the prediction-gaging mode, converts the prediction-gaging signals to a figure of merit representing the difference in the class values of the production vane and the master. In the classification-gaging mode, the computer converts the classification-gaging signals from the fixture to the true class value of the production vane.

A particularly unique and important feature of the invention resides in the fact that no clamping forces of any kind are exerted on the production vane or the master during either prediction or classification. As a consequence, the vanes are not distorted, and the instrument provides prediction and classification readings of relatively high accuracy and precision.

According to another feature of the invention, the present prediction and classification instrument is arranged to measure or gage all of the critical vane dimensions, including the effective airfoil length. As a consequence, the present gaging instrument performs the classification and prediction-gaging procedure in minimum time with a relatively high degree of accuracy and precision, thus reducing the overall turbine vane production time and cost.

BRIEF DESCRIPTION OF THE DRAWINGS

In the drawings:

FIG. 3 is an enlarged section taken on line 3—3 in FIG. 2;

FIG. 4 is a rear elevation of the turbine vane in FIG. 1 looking at the convex side of its airfoil;

FIG. 5a, 5b, 5c are sections through three chord stations A, B, and C of the turbine vane in FIG. 4;

FIG. 6 is a front elevation of the present turbine vane prediction and classification gaging instrument;

FIG. 7 is an elevational view of the right-hand side of the gaging fixture of the instrument;

FIG. 12 is a section taken on line 12—12 in FIG. 7;

FIG. 13 is a detail of one gage of the fixture;

FIG. 13A is a section taken on line 13A—13A in FIG. 13;

FIG. 14 is a detail of another gage of the fixture;

DESCRIPTION OF THE PREFERRED EMBODIMENTS

Figure 1:
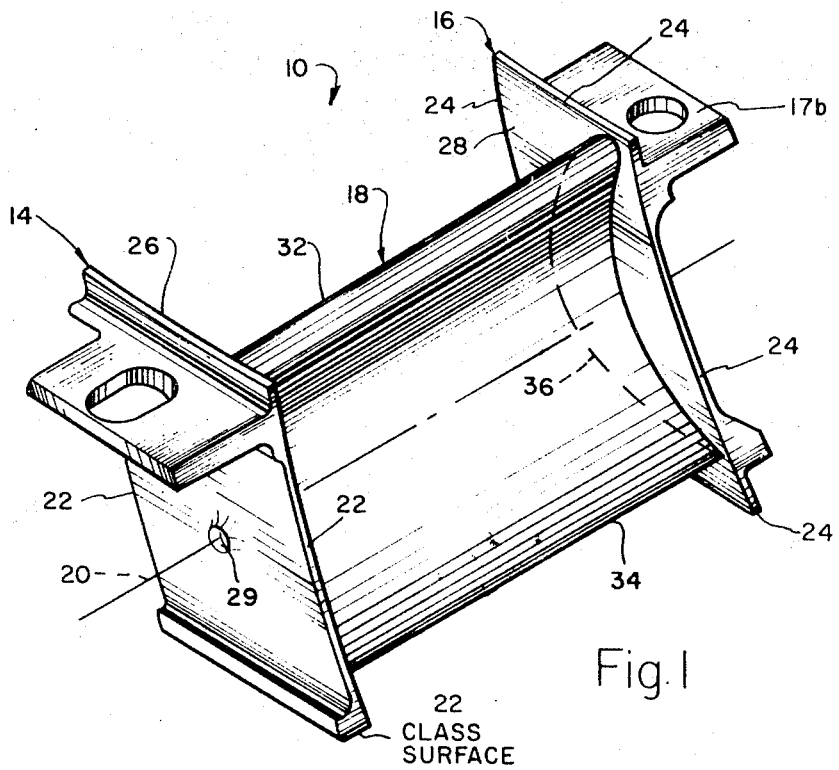
FIG. 1 is a perspective view of a turbine vane.
Figure 2:
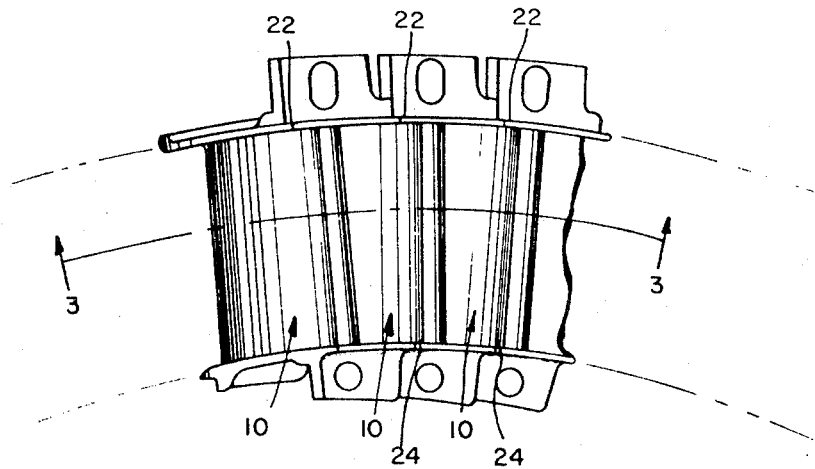
FIG. 2 is a fragmentary side elevation of a jet engine nozzle ring composed of a number of turbine vanes like that shown in FIG. 1.
Figure 8:
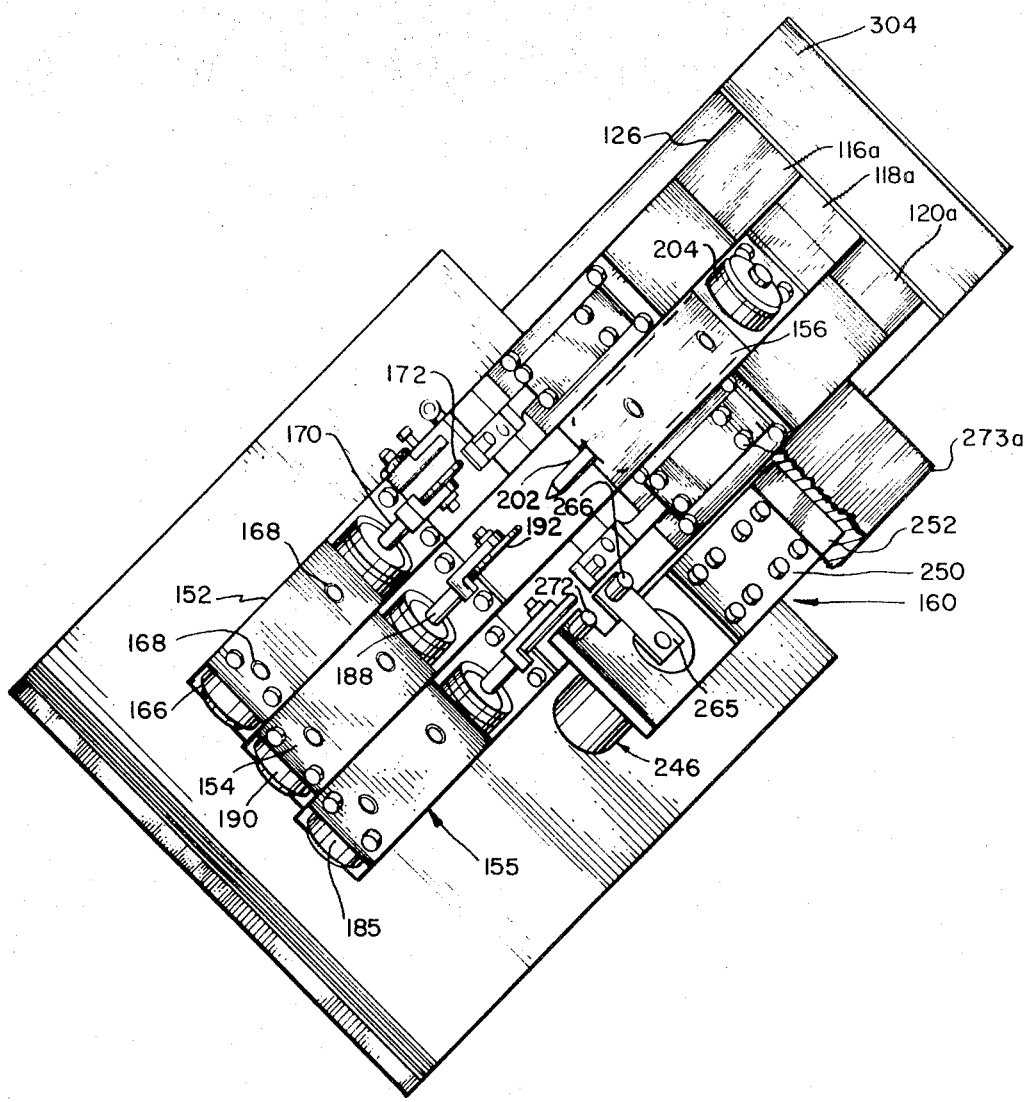
FIG. 8 is a front view of the gaging fixture looking in the direction of the arrow 8 in FIG. 7.
Figure 15:
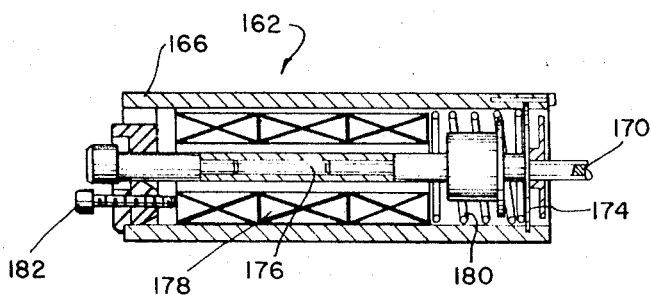
FIG. 15 is a longitudinal section through a gage transducer.

Reference is made at first to FIG. 1 illustrating a typical turbine vane 10 of the type which is gaged in the present instrument and to FIG. 2 and 3 illustrating a portion of a jet engine nozzle ring 12 embodying the vanes 10. Each turbine vane 10 has tip and root buttresses 14, 16 with flanges 17a, 17b, an intervening airfoil 18, and a longitudinal stacking axis 20. Buttresses 14 and 16 have laterally presented edge surfaces 22 and 24 and confronting longitudinally presented shoulder faces 26 and 28. Tip buttresses 14 has a machined locating face 29 on and normal to stacking axis 20.

In the nozzle ring 12, the vanes 10 are assembled side by side with the vane stacking axes 20 extending radially of the nozzle ring. The assembled vanes are joined by means not shown to provide a rigid annular nozzle ring structure. The adjacent vanes define intervening tapered flow passages 30. Each flow passage is bounded along its two radial sides by the adjacent vane airfoils 18 and along its root and tip ends by the vanes buttress surfaces 26, 28. The cross-sectional area of each flow passage diminishes in a direction from the leading edges 34 of the vane airfoils 18. Each passage has a minimum cross-sectional area measured in a plane $P_M$ of minimum spacing between adjacent vanes. Planes $P_M$ contains the trailing edge 34 of one vane and intersects the confronting convex airfoil surface 36 of the opposing vane along a line passing through the points of tangency with the surface of circular arcs K generated about the trailing edge as a center. The minimum area portion 38 of the passage is commonly referred to as a throat and its area S the exit area of the vane flow passage 30. One of the tip buttress surfaces 22 provides a reference surface, or class surface as it is called and designated in the drawings, which seats against a mounting or bolting surface, not shown.

As noted earlier, a typical turbine vane may be used in a range of angular positions to achieve desired aerodynamic and thermodynamic characteristics in the completed jet engine. In this regard, it will be observed in FIG. 3 that rotation of the vanes 10 about their stacking axes 20 to vary the angle of the vane airfoils 18 relative to the plane of the nozzle ring 12 increases or reduces, depending upon the direction of the rotation, the areas of the vane throats 38. In actual practice, such vane rotation is accomplished, not by physically rotating the vanes about their stacking axes, but rather by machining their class surface 22 at various angles to orient the vane airfoils 18 at various angles relative to the nozzle ring plane. The different angles at which vanes of a given design may be used and the resulting throat areas are referred to as classes. The delta angle between successive classes is constant, or approximately constant, over the entire class range. According to the conventional jet engine design practice discussed earlier, the engine designer specifies the nominal airfoil angle, center spacing, and throat area for a nozzle ring vane set. The vane class which has this nominal airfoil angle and throat area is referred to as the basic class, its airfoil angle as the basic class angle, and its throat area as the basic class area. The jet engine is initially constructed with a nozzle ring composed of such basic class vanes. After construction, the engine is tuned by replacing selected vanes by vanes of another class or other classes, as necessary to provide the engine with the proper nozzle ring flow area for optimum engine operation.

It will also be recalled from the earlier discussion that according to conventional turbine vanes manufacturing practice, the turbine vanes for a particular engine design are initially cast to the basic class angle. The class surface 22 of the castings are then machined to the appropriate angles to provide finished vanes of the full range of classes required for engine tuning purposes. Since the throat area between two vanes paired on given centers is a function of both the airfoil angle and airfoil dimensions of the vanes, the deviations between the actual airfoil dimensions of the cast production vanes and the nominal airfoil dimensions of the class vane used in the theoretical engine design must be taken into account when machining the castings in order to achieve finished vanes of a desired class.

In this latter regard, assume a pair of perfect vanes of given basic class, that is a pair of vanes which conform exactly to a theoretical basic class vane design, assembled side by side on specified centers within a nozzle ring, as in FIG. 3. Being perfect vanes, the latter define an intervening throat 38 whose area exactly equals the throat area of the basic vane class. Assume next that one vane of the vane pair, say the vane whose convex airfoil surface 36 borders the throat, is replaced by a production vane whose airfoil 18 is oriented at the same basic class angle but has slightly different dimensions and hence a different blocked area than the airfoil of the perfect vane. In this case, the actual throat area between the production vane and the remaining perfect vane differs from the class throat area by an amount equal to the difference between the blocked areas of the production vane and the perfect vane. In order to provide the production vane with the basic class value of the perfect vane or some other selected class value, the airfoil of the production vane must be rotated to an angle equal to the airfoil angle of the selected class plus or minus a compensating angle necessary to compensate or correct for the difference in the blocked areas of the perfect basic class vane and production vane. As noted earlier, this rotation of the airfoil is accomplished, not by physically turning the vane, but by machining its class surface 22 at the proper angle.

It will now be understood that the described practice of producing turbine vanes of a full range of classes for a particular jet engine design from production vanes that are initially cast to the basic class angle used in a given theoretical design involves the following steps:

1. Gaging the airfoil of each production vane at the basic class angle to determine its dimensional deviations, if any, from the nominal dimensions of the basic class vane airfoil used in the theoretical design;
2. Determining the angle to which the class surface 22 of each production vane must be machined to compensate for such dimensional deviations and provide the finished vane with a selected class value;
3. Machining the class surface of each production vane to the appropriate angle; and
4. Gaging each machined production vane to determine its true class value.

The above procedure is referred to broadly as prediction and classification gaging. The first step constitutes a prediction-gaging step and the last step constitutes a classification-gaging step.

The present invention is concerned with a prediction and classification-gaging procedure which involves the use of so-called class formulas, referred to later as prediction and classification formulas, that express class value and class difference (figure of merit) in terms of certain critical airfoil and class surface dimensions. According to this procedure, a perfect vane, or master, is prepared whose critical foil and class surface dimensions exactly equal those of the basic class vane used in the theoretical design. The critical airfoil dimensions of this master and a production vane are then compared, and the differences or deltas, if any, in the corresponding dimensions are combined in accordance with the appropriate class formula (prediction formula) to obtain a figure of merit representing the difference in class values of the master and vane resulting from the differences, if any, in the airfoil dimensions. This figure of merit is converted, with the aid of existing tables, to a predicted angle at which the class surface of the production vane must be machined to provide the finished vane with a selected class value. The above steps constitute the prediction-gaging phase of the gaging procedure. After machining of the class surface of the production vane to the predicted angle, the critical airfoil and class surface dimensions of the master and production vane are compared and the differences or deltas in the corresponding dimensions are combined in accordance with the appropriate class formula (classification formula) to obtain the true class value of the vane. The latter steps constitute the classification-gaging phase of the gaging procedure.

In connection with this prediction and classification procedure, consider FIGS. 5a, 5b, and 5c which are sections through the airfoil 18 of a perfect basic class vane at three chord stations, A, B, and C (FIG. 4) located at the root end, center and tip end, respectively, of the airfoil. The points $a$, $b$, and $c$ in these figures represent points on the convex airfoil surface 36 at the respective chord stations located in the throat plane $P_M$. The reference characters $P_{a-1}$, and $P_{b-1}$, and $P_{c-1}$, represents plane tangent to the convex airfoil surface at the points, $a$, $b$, and $c$, respectively. The reference characters $P_{1-2}$, $P_{b-2}$ represent planes parallel to the corresponding planes $P_{a-1}$, $P_{b-1}$, and $P_{c-1}$ and tangent to the airfoil-trailing edge 34 at the concave side of the vane. The reference characters R, S, and T represent the effective airfoil thickness dimensions at the chord stations A, B, and C, respectively, measured between and normal to the corresponding tangent planes $P_{a-1}$, $P_{a-2}$, $P_{b-1}$, $P_{b-2}$, $P_{a-3}$, and $P_{b-3}$. The reference character U represents the effective length of the airfoil 18 measured between determined points on the confronting buttress shoulder faces 26, 28 adjacent the throat plane $P_M$.

Referring now again to the prediction and classification-gaging procedure discussed above, the critical delta dimensions used in the procedure are the differences or deltas between the following dimensions of the master and the production vane being gaged: the airfoil thickness dimensions R, S, and T and the airfoil length dimension U. The class formulas in which these dimensions are used to obtain the figure of merit and class value of a production vane vary from one vane design to another and will be discussed presently. Suffice it to say at this point that the above-mentioned delta dimensions which are used in the formulas to obtain the figure of merit and class value of a production vane are hereafter referred to by the reference characters $\Delta R$, $\Delta S$, $\Delta T$, and $\Delta U$, respectively.

The present invention provides a prediction and classification-gaging instrument 100 for performing the prediction and classification gaging procedure outlined above. This gaging instrument includes two major components, namely, a gaging fixture 102 and a computer 104. The gaging fixture 102 is equipped with vane-supporting means 106 and electrical gaging means 108 for gaging and generating electrical signals representing the critical vane measurements or deltas referred to above. The computer 104 combines these electrical signals in accordance with the appropriate class formula for the vane being gaged to provide prediction and classification readouts, as explained below. The gaging instrument 100 has two operating modes, a prediction-gaging mode and a classification-gaging mode. In each mode, a master and a cast vane are gaged in succession in the fixture 102. At this point, it is significant to note that an actual master only simulates the basic class vane used in the theoretical design; that is to say, the master is provided with gaging surfaces which are accurately machined to provide the master with R, S, T, and U dimensions exactly equal to those of the basic class vane used in the theoretical desing, but the actual overall shape of the master differs substantially from that of the basic vane configuration. However, for simplicity, it will be assumed in the present disclosure that the master has a true vane shape. Further, at some points in the ensuing description, it will be assumed that the vane which is illustrated in the gaging fixture 102 is the master and at other points in the description it will be assumed that the illustrated vane is a production vane to be gaged. The same reference characters and numerals used in the earlier description of the vane 10 will be applied to the master, except that the master will be referred to in its entirety by the numeral 10.

The instrument is initially set in its prediction-gaging mode and the master 10 is placed at its basic class angle in the vane-supporting means 106. The instrument is nulled to register a zero figure of merit readout indicative of the fact that the gaged dimensions and hence effective blocked area of the master conform exactly to those of the basic vane configuration used in the theoretical design. The master 10 is now replaced by the production vane 10 to be gaged and the vane is rocked on its trailing edge 34 through a position wherein the vane tip chord station C is oriented at the same angle as the master tip chord station. Rotation of the vane through this position triggers the computer 104 to read the R, S, and U dimensions of the vane and register a figure of merit readout representing the difference between the class value of the production vane and master resulting from differences in the R, S, and U dimensions of the vanes.

In the next step of the prediction and classification-gaging procedure, the figure of merit reading just obtained is converted, with the aid of prepared tables, to an angular value representing the angle to which the class surface 22 of the production vane must be machined to provide the finished vane with a selected class value. The production vane 10 is then removed from the gaging fixture 102 and its class surface machined to the appropriate angle by the conventional vane-machining technique.

The gaging instrument 10 is now set in its classification-gaging mode and the master 110 is repositioned at its basic class angle in the gaging fixture 102. The instrument is adjusted to register the basic class value of the master. Thereafter the master is replaced by the machined vane 10 and the latter is rocked through successive positions wherein its tip chord station C and then its class surface 22 are oriented at the same angles as those of the master. Rotation of the vane through these positions triggers the computer to read and store the U-dimension, then read the R-, S-, and T-dimensions, and finally compute and register the true class value of the machined vane.

The gaging fixture 102 comprises a horizontal baseplate 112 having supporting legs 114. Fixed side by side to the upper surface of the baseplate are three triangular baseblocks 116, 118, and 120 with sloping front faces 116A, 118A, and 120A. The front faces of the two outer blocks, 116, 120, have aligned notches 122.

The vane-supporting means 106 of the fixture comprise a pair of essentially identical vane supports 124 on the two outer base blocks 116, 120. Each support comprises a channel-shaped bracket 126 which is bolted to the block front face just above the block notch 1226, with the axis of the channel extending lengthwise of the face. Slidable in each channel bracket 126 is a bar 128. A clamp plate 130 extends across the top of each bracket and is attached to the latter by bolts 132. These bolts may be tightened to clamp the bar 128 in fixed position within the bracket. The front or lower end of the support bar 128 has an upper recess 134 which exposes the abutting ends of a pair of hardened pins 136, 138 press fitted in the bar. Pin 136 extends parallel to the longitudinal axis of the bar. Pin 138 extends perpendicular to the bar axis and hence to the pin 136. Accordingly, the pins 136, 138 on each support bar 128 define a right-angle corner 140, or trap as this corner is hereinafter referred to. As will appear presently, the traps 140 of the vane supports 124 seat the trailing airfoil edges 34 of the production vane 10 being gaged and the master 110. Threaded in the outer end of each bar 128 is a set screw 142 which seats against the rear wall of the adjacent baseblock notch 122 to vertically support the bar end against downward deflection. The set screws are adjustable to provide this support in every position of adjustment of the bars 128 relative to their channel brackets 126.

As noted earlier, and explained in greater detail in the ensuing description, the master 110 and production vane 10 are placed in the traps 140 successively. For convenience in this ensuing description, both the production vane and the master will be referred to, in places, simply as vanes. When a vane is seated in the traps, its airfoil 18 projects laterally out from the base blocks 116, 118, and 120 with the convex airfoil surface 36 facing the lower ends of these faces. The outer baseblock notches 122 provide clearance for the vane buttresses 14, 16, as shown. It will be observed that the traps accommodate limited pivotal movement of the vane about its trailing edge.

The electrical gaging means 108 of the gaging fixture 102 comprise six electrical gages 152, 154, 155, 156, 158, and 160. Gage 152 includes an electrical linear variable differential transformer or transducer 162 mounted in a holder 164. This holder is bolted to the front face 116A of the left-hand baseblock 116, just below its notch 133. Transducer 162 has a housing 166 slidable in the holder 164 and fixed in position by setscrews 168. Longitudinally movable in the housing is a plunger 170 which extends from the upper rear end of the housing. The outer end of the plunger mounts a hardened roller or wheel 172. Plunger 170 is supported for axial movement in the housing 166 by flexure 174 and includes a magnetically permeable core 176. Surrounding the core is an axially adjustable coil 178. A spring 180 seats against one end of the coil. A setscrew 182 seats against the other end of the coil. Set screw 182 is threaded in and accessible externally of the transducer housing 166 for adjusting the axial position of the coil relative to the transducer housing and the plunger. Coil 178 has a center primary winding to be energized from an AC source and two outer secondary windings which are found and connected in the well-known way to provide an output voltage signal, when the primary winding is energized, representing the relative axial position of the core and coil and hence the relative axial position of the transducer plunger 170. Thus, the transducer produces a zero or null output when the core occupies its centered or null position relative to the coil 178, and an output voltage which varies linearly with axial displacement of the core from its null position. The output voltage has one phase relative to the excitation voltage when the core displacement is to one side of the null position and an opposite phase when the core displacement is to the opposite side of the null position.

Gages 154, 155 are essentially identical to gage 152 and hence need not be described in detail. Suffice it to say that gages 154, 155 include electrical transducers 184, 185 adjustably mounted in holders 186, 187 bolted to the front faces 118A, 120A of baseblocks 118, 120. The transducer plungers 188, 189 extend from the upper rear end of the transducer housings 190, 191 and mount hardened rollers or wheels 192, 193. The transducer coils are adjustable relative to the housings and plungers by setscrew 194, 195.

Gage 156 is also similar to gage 152 and includes an electrical transducer 198 adjustably mounted in a holder 200 bolted to the front face 118A of baseblock 118 above and directly opposite gage 154. The upper portion of the block face 118A supporting the gage 156 is stepped downwardly relative to the lower portion of the block face supporting the gage 154. This stepped configuration of the block face locates the gages 154, 156 in laterally offset relation, as shown, for reasons to be explained presently. Transducer 198 includes a plunger 202 which extends from the lower end of the transducer housing 204 and terminates in a hardened tip 206. At the upper end of the housing is a setscrew 208 for adjusting the transducer coil relative to the housing and plunger. As will be explained presently, the vane gages 152, 154, 155, and 156 are arranged to contact the vane currently positioned in the fixture at its root, center, and tip chord stations A, B, and C. Gages 152, 154, 155, and 156 gage the ΔR, ΔS, and ΔT vane measurements, referred to earlier.

Gage 158 gages the ΔU vane measurement and comprises an electrical transducer 210 essentially identical to the other transducers. Thus, the transducer 210 has the plunger 212 which extends axially from one end of the transducer housing 213 and terminates in a threaded end 214. A setscrew 216 is exposed at the opposite end of the housing for adjusting the transducer coil. Transducer 210 is loosely received in aligned bores 218 extending through the base blocks 116, 118, and 120 parallel to the baseplate 112 and normal to the axes of the gages 152, 154, 155 and 156.

In addition to the transducer 210, gage 158 includes a pair of gage arms 220, 221 positioned within aligned grooves or recesses 222, 223 in the outer baseblocks 116, 120. The transducer bore 218 opens to the recesses, as shown. The lower ends of the gage arms 220, 221 are hingably attached by flexures 224, 225 to blocks 226, 227 fixed within the lower ends of the recesses 222, 223. The transducer body 213 extends through and is fixed to arm 220. The threaded end 214 of the transducer plunger 212 extends through and is fixed to arm 221. Fixed in and projecting outwardly from the upper ends of the arms 220, 221 are hardened gage pins 234, 236. Gage pins 234, 236 are located on a common axis R parallel to the axis of transducer 210 and are arranged to seat against the inner shoulder faces 26, 28 of the vane buttresses 14, 16.

The remaining gage 160 is arranged to gage the angle of the vane class surface 22 and has a novel construction which is uniquely adapted to this function. Gage 160 comprises a transducer 246 mounted in a holder 248 in the form of a rectangular block. Holder 248 is attached by a pair of flexures 250 to a mounting block 252 bolted to the outer right-hand face of the right-hand baseblock 120. Bolted to the inner surfaces of the flexures 250 are rigid plates 254. In the normal position of the gage, the flexures 250 are parallel to one another and normal to the axis of the gage transducer 246. These flexures have equal effective lengths measured between their points of attachment to the transducer holder 248 and mounting block 252. Also, the points of attachment at each end of the flexures are aligned in a direction parallel to the transducer axis. Finally, the plates 254 have equal length somewhat less than the effective flexure lengths and are centered between the points of flexure attachment. From this description, it will be understood that the flexure support 250, 254 effectively forms a parallelogram spring mount for the transducer 246 which supports the latter for translational movement along its axis. Mounting block 252 has a reduced extension 256 projecting between the flexure plates 254 for limiting translation movement of the transducer. Acting between the holder 248 and a bracket 258 attached to the mounting block 252 is a compression spring 260.

Transducer 256 is essentially similar to the transducers 156, 158 and includes a housing 262 adjustably secured within the holder 248. Fixed to the upper end of the transducer plunger 264 is an arm 265 which projects laterally through a slot 265a in holder 248 and mounts a hard pin 266. A setscrew 268 adjusts the transducer coil. Holder 268 has a bracket arm 270 in which is threaded a hard pin 272 aligned with pin 266 in the fore-and-aft direction of the fixture. As may be best observed in FIG. 13A, gage pins 266, 272 are located within the notch 122 in baseblock 120. It will now be understood that the flexures 250 support the gage transducer 246 and gage pin 272 for axial translation in unison. The transducer plunger 264 is also axially movable independently of the gage pin 272.

As noted earlier, the present gaging instrument 100 is used for practicing a prediction and classification-gaging procedure wherein the R, S, and U dimension of a production vane 10 and master 110 are compared and the dimensional differences, if any, are combined according to a prediction formula to obtain a figure of merit representing the difference in the class values of the vane and master. This figure of merit is then converted to an angle to which the class surface 22 of the production vane must be machined to provide a finished vane of the desired class value. After machining of the surface, the R, S, T, and U dimensions of the vane and master are compared and the dimensional differences are combined according to a classification formula to provide a readout representing the true class value of the vane.

To this end, the gaging fixture 102 is designed to receive, in the illustrated gaging position, both the production vane 10 to be gaged and the master vane 110. In this gaging position, the root end of the vane currently positioned in the fixture, i.e. either the cast vane or the master, is located at the left-side of the fixture as the latter is viewed from the front. The trailing edge 34 of the vane airfoil 18 rests in the traps 140 with the trailing edge seating downwardly against the trap pins 136 and rearwardly against the trap pins 138. The wheels 172, 192, and 193 of the vane gages 152, 154, and 155 engage the convex airfoil surface 36 at positions spaced along the airfoil 18. The plunger tip 206 of the vane gage 156 engages the vane-trailing edge 34 at the concave side of the airfoil 18. The gage pins 234, 236 of the vane gage 158 seat against the confronting root and tip buttress shoulder faces 26, 28, respectively. Finally, the gage pins 266, 272 of the vane gage 160 seat against the confronting tip buttress class surface of the vane.

The two pins 136, 138 of each vane trap 140 are perpendicular to one another and located in a common plane $P_T$ normal to the common axis R of the gage pins 234, 236. The two planes $P_T$, which are hereafter referred to as trap planes, are spaced a distance equal to the spacing between the root and tip chord stations A, C of the vanes to be gaged. The wheel 193 of the vane gage 155 is located in the right-hand or tip trap plane $P_T$ as the gaging fixture is viewed from the front. The wheel 172 of the left-hand vane gage 152 is located in the left-hand or root trap plane $P_T$. The wheel 192 and the plunger 202 of the center vane gages 154, 156 are located in a common plane between and parallel to the trap planes, and spaced from the trap planes distances equal to the spacing between the center chord station B and the root and tip chord stations A, C of the vanes to be gaged.

The vane traps 140 are so arranged that when the trailing edge 34 of a vane is properly seated in the traps, its stacking axis 20 is parallel to the common axis R of the gage pins 234, 236 and perpendicular to the trap planes $P_T$. Accordingly, the chord planes of the three vane chord stations, A, B, and C are then perpendicular to the axis R and parallel to the trap planes $P_T$. A fixed bracket 273a mounts screws 273b, 273c which are engageable with the vane flange 17a and locating face 29, as explained shortly, to locate the vane endwise in a position wherein the chord planes of the root and tip chord stations, A, C of the vane coincide with the two trap planes $P_T$. The center vane gages 154, 156 are so located that the common plane of the gage wheel 192 and gage plunger 202 coincides with the plane of the center vane chord station B. Thus, the wheels 172, 192 of the vane gages 152, 154 contact the convex surface 36 of the vane airfoil 18 at its root and center chord stations A, B, respectively. The wheel 193 of the vane gage 155 contacts the convex airfoil surface at its tip chord station C. The plunger 202 of the vane gage 156 contacts the trailing edge of the airfoil at its center chord station B.

As explained later, during gaging operation of the instrument, the master 110 is placed in the fixture 102 at its basic class angle relative to the fixture baseplate 112. In this position the master class surface parallels the baseplate and the master airfoil is oriented at the basic class angle relative to the baseplate. The master trailing edge 34 then coincides with a trap axis passing through the right angle corners of traps 140.

From the earlier discussion relative to FIGS. 5a, 5b, and 5c it will be recalled that points $a$, $b$, and $c$ represent points on the convex airfoil surface 36 at the chord stations, A, B, and C located in the throat plane $P_M$ of the vane. In other words, points $a$, $b$, and $c$ are the points of tangency, at the chord stations A, B, and C of the convex airfoil surface with circular arcs (i.e. arcs K in FIG. 3) generated about the trailing edge 34 of an adjacent vane. Assuming the illustrated vane to be a perfect vane or master 110, the arcs which define the tangency points $a$, $b$, and $c$ have predetermined radii $R_a$, $R_b$, and $R_c$ equal the width of the vane throat 38 at the chord stations A, B, and C, respectively, and are hereafter referred to as throat width dimensions. The R, S, and T dimensions are effective airfoil thickness dimensions measured between and are normal to the respective tangent plants $P_{a-1}$, $P_{a-2}$, $P_{b-1}$, $P_{b-2}$, $P_{c-1}$, and $P_{c-2}$. The U-dimension is the effective airfoil length dimension measured between the confronting buttress shoulder faces 26, 28 approximately in the throat plane $P_M$.

The vane gages 152, 154, and 155 are so constructed and arranged on the fixture 102 that when the master 110 occupies its basic class angle or gaging position in the fixture, with the gage wheels 172, 192, and 193 in contact with the master airfoil 18, the wheel centers are located on a common axis which parallels the trap axis defined above and these axes occupy the same relative positions as do the trailing edges 34 of two adjacent perfect vanes or masters 110 when assembled in the manner of FIG. 3. The wheel 193 of gage 155 has a radius equal to the throat width dimension $R_c$ at the tip chord station C and contacts the convex airfoil surface 36 of the master at its tip chord station tangency point c. The longitudinal axis of adjustment of the adjacent vane trap support bar 128 and the axis of the gage plunger 189 are perpendicular to a plane $P_{c-3}$ tangent to the gage wheel 193 at its point of contact with the master foil surface 36. The front vane-engaging side of the adjacent trap pin 138 is located in a plane $P_{c-4}$ normal to the bar axis and parallel to the tangent plane $P_{c-3}$.

The wheel 172 of the vane gage 152 has a radius equal to the throat width $a$, $R_a$ at the root chord station A of the master and contacts the convex airfoil surface 36 of the master at its root chord station tangency point $a$, when the master occupies its gaging position. The longitudinal axis of the plunger 170 of the gage transducer 162 is perpendicular to a plane $P_{a-3}$ tangent to the gage wheel 172 at its point of contact with the airfoil surface 36. The longitudinal axis of adjustment of the adjacent vane trap support bar 128 is perpendicular to the latter tangent plane $P_{a-3}$. The front vane-engaging side of the adjacent trap pin 138 is located in a plane $P_{1-4}$ perpendicular to the latter support bar axis and parallel to the tangent plane $P_{a-3}$.

The wheel 192 of the vane gage 154 has a radius equal to the throat width dimension $R_b$ at the center chord station B of the master and contacts the convex airfoil surface 36 of the master at its center chord station tangent point $b$ when the master occupies its gaging position in the fixture. The longitudinal axis of the plunger 188 of the gage transducer 154 is perpendicular to a plane $P_{b-3}$ tangent to the gage wheel 192 at its point of contact with the airfoil surface 36. The longitudinal axis of the plunger 202 of the gage transducer 156 is perpendicular to the latter tangent plane. The end vane-engaging face of the plunger tip 206 is located in a plane $P_{b-4}$ perpendicular to the plunger axis and parallel to the tangent plane $P_{b-3}$.

As noted earlier, the gage pins 234, 236 of the vane gage 158 have a common axis R which is normal to the trap planes $P_T$ and parallel to the stacking axis 20 of the master 110 when the latter occupies its gaging position in the fixture 102. The gage pins are mounted on the fixture to contact the buttress shoulder faces 26, 28 of the master at the points on these faces between which is measured the airfoil length dimension U in FIG. 4.

Referring to FIG. 13, it will be seen that the remaining gage 160 is mounted on the gaging fixture 102 so that its gage pins 266, 272 are normal to the adjacent class face 22 of the tip buttress 14 of the master 110 when the latter is in gaging position. The plunger and pin are laterally spaced a predetermined distance approximating the length of the face so that the plunger and pin contact the face adjacent its ends. In this regard, it will be observed that the gage pin 272 is retained in seating contact with the class face by the gage flexures 250 and spring 260. The gage 266, on the other hand, is retained in seating contact with the class face by the conjoint action of the gage flexures 250, spring 260, and the flexure 174 in the gage transducer 246.

Figure 9:
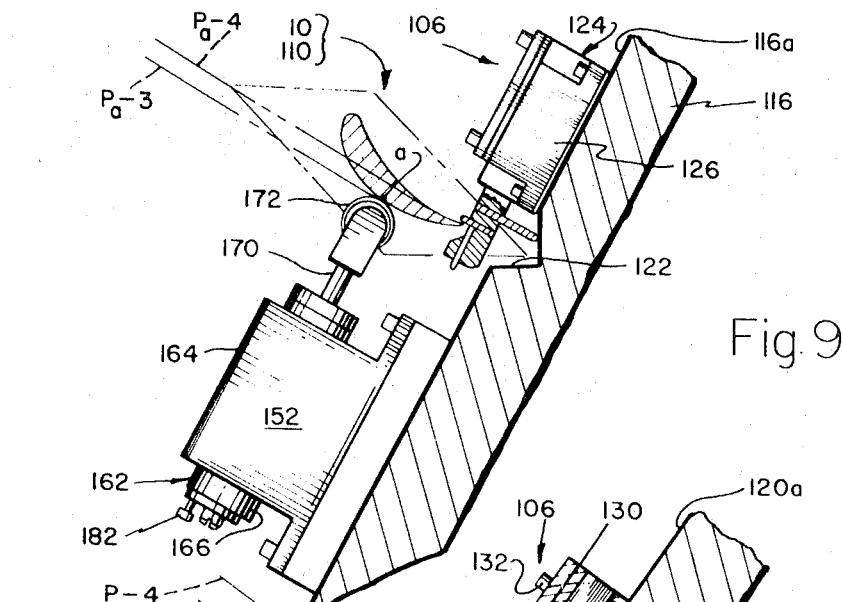
FIG. 9 is a section taken on line 9—9 in FIG. 6.
Figure 11:
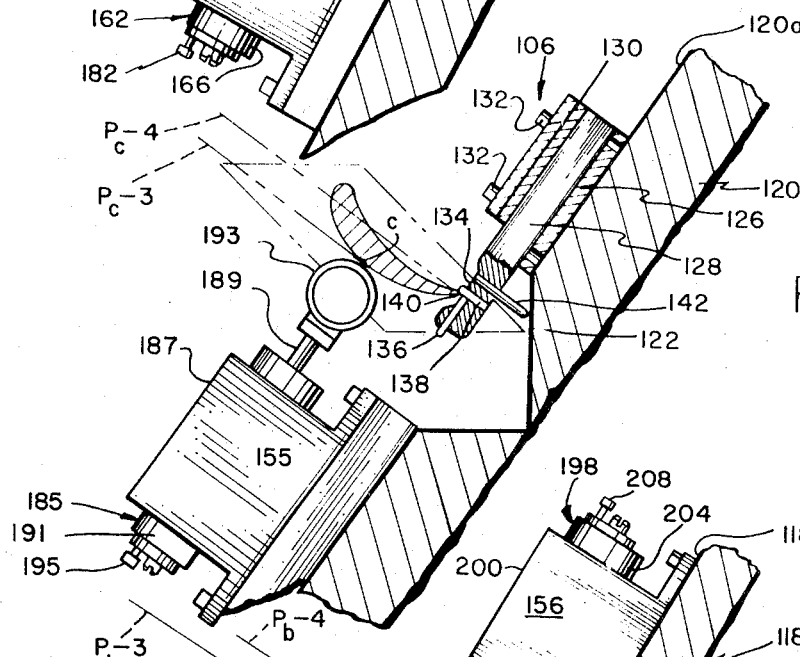
FIG. 11 is a section taken on line 11—11 in FIG. 6.
Figure 10:
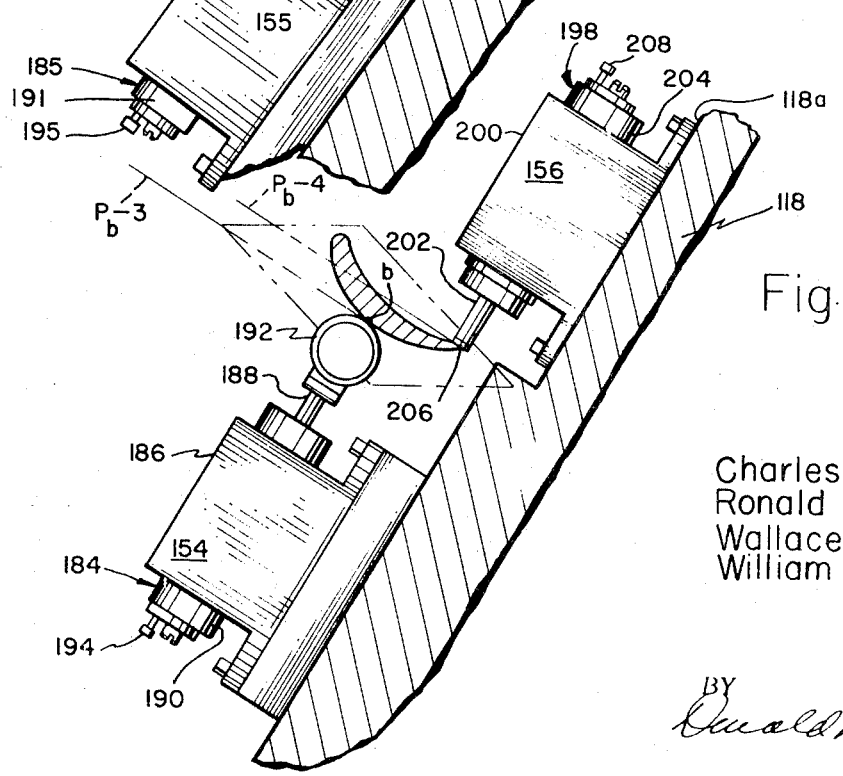
FIG. 10 is a section taken on line 10—10 in FIG. 6.

From the description to this point, it is evident that when a vane (either a production vane 10 or the master 110) is placed in gaging position in the gaging fixture 102, the perpendicular spacing between the planes $P_{a-3}$, $P_{a-4}$ in FIG. 9 equals the effective airfoil thickness R (FIG. 5a) of the vane at its airfoil root chord station A. Accordingly, since the vane traps 140 are fixed during the gaging operation, the axial position of the transducer plunger 170 of vane gage 152 is related to the effective airfoil thickness R. Similarly, the perpendicular spacing between the planes $P_{b-3}$, $P_{b-4}$ in FIG. 10 equals the effective airfoil thickness S (FIG. 5b) at the center chord station B of the vane. The relative axial positions of the transducer plungers 188, 202 of vane gages 154, 156 are thus related to the airfoil thickness S. Finally, the perpendicular spacing between the planes $P_{c-3}$, $P_{c-4}$ in FIG. 10 equals and the axial position of the tip gage plunger 189 is related to the effective airfoil thickness T (FIG. 5c) at the tip chord station C of the vane. The gage pins 234, 236 of the vane gage 158 seat against the inner confronting faces 26, 28 of the root and tip buttresses 14, 16 of the vane. The relative axial positions of the plunger 212 and body 213 of the gage transducer 210 is thus related to the airfoil length dimension U in FIG. 4. The gage pins 266, 272 of the remaining gage 160 seat against the tip buttress class face 22 of the vane. The relative axial positions of the plunger and pin is thus related to the angle of the class face relative to the baseplate 112.

The operation of the gaging fixture 202 will now be described. As noted earlier, the present gaging instrument has two gaging modes, to wit, a prediction-gaging mode and a classification-gaging mode. In the prediction-gaging mode, the master 110 is initially fixed in any convenient manner in its basic class angle gaging position in the fixture, and the transducers of the vane gages 152, 154, 155, 156, 158, and 160 are nulled by axially adjusting their coils relative to their plungers. In this regard, it will be recalled that such transducer has a coil-adjusting screw. It should also be noted here that the transducers are energized from an AC power supply, to be described presently, and that computer 104 is equipped with means for reading the output voltage of each transducer to permit nulling of the transducers. Suffice it to say at this point that when the transducers have been properly nulled, each transducer produces a null or zero output voltage.

A production vane 10 is now placed in the fixture and is rocked fore and aft in the traps 140, about the vane-trailing edge 34, through the null position of the T-gage transducer 185. As explained later, rotation of the vane through this position triggers the computer 104 to read the output voltages, if any, of the R, S, and U gages 152, 154, and 158. Thus, transducer 162 of the root vane gage 152 produces an output voltage proportional to the difference $\Delta R$ in the effective airfoil thickness dimension R at the root chord station A of the vane and master. The transducers 184, 198 of the center vane gages 154, 156 produce output voltages whose sum or difference, depending upon whether the transducer coils are wound in the same direction or in opposite directions, is proportional to the difference $\Delta S$ in the effective airfoil thickness dimension S at the center chord station B of the vane and master. In the particular embodiment of the invention illustrated, the center gage transducer coils are wound in such a way that the difference between the transducer output voltages is proportional to the difference $\Delta S$ in the effective airfoil thickness dimension S at the center chord station B of the vane and master. In the particular embodiment of the invention illustrated, the center gage transducer coils are wound in such a way that the difference between the transducer output voltages is proportional to the difference $\Delta S$ in the airfoil thickness dimension S of the production vane and master. Finally, the transducer 210 of the vane gage 158 produces an output voltage proportional to the difference $\Delta U$ in the effective airfoil length dimension U of the vane and master. The output voltage of the remaining class face transducer 160 is not involved in the prediction classification mode of the instrument. In the prediction mode, the vane locator screw 273c is threaded in to engage its head with bracket 273a and its tip with the vane locator face 29. This screw locates both the master and production vane in the proper longitudinal position relative to the gages during prediction and remains in contact with the locator face 29 of the production vane throughout its rocking angle. It will appear presently that the above $\Delta R$, $\Delta S$, and $\Delta U$ dimensions to which the gage output voltages are proportional are the same $\Delta R$, $\Delta S$, and $\Delta U$ dimensions which are included as terms of the prediction formula mentioned earlier. As will be explained presently, the computer 104 of the gaging instrument combines the $\Delta R$, $\Delta S$, and $\Delta U$ output voltages of the gages 152, 154, 156, and 158 in the prediction-gaging mode according to the prediction formula for the particular vanes being gaged and produces a figure of merit readout representing the difference in the class values of the production vanes and master. This figure of merit readout is then converted, with the aid of existing conversion tables, to an angle at which the class face 22 of the production vane must be machined to provide the finished machined vane with a selected class value. The class face of the vane is then machined to that angle by existing vane-machined techniques.

In the classification-gaging mode of the gaging instrument, the master 110 is replaced in gaging position in the gaging fixture 102 and the locator screw 273c is retracted and screw 273b is threaded in to engage its head with bracket 273a and its tip with the master flange 17b to locate the master, and later the production vane, in the proper longitudinal position relative to the gage. The null condition of each vane gage 152, 154, 155, 156, 158, and 160 is checked and reestablished, if necessary. The machined production vane 10 is then replaced in the fixture and the vane is rocked first through the null position to the T-gage transducer 185 and then through the null position of the class surface gage transducer 246, hereafter referred to as a W-gage transducer. As explained later, the computer 104 is triggered to read and store the $\Delta U$ output of the U-gage transducer 210 in response to rotation of the vane through the T-gage null position. Rotation of the vane through the W-gage null position triggers the computer to read the $\Delta R$, $\Delta S$, and $\Delta T$ outputs of the R-, S-, and T-gate transducers 162, 184, 185, and 198, then combine these latter outputs with the stored $\Delta U$ output according to classification formula for the vane, and finally produce a readout representing the true class value of the vane. The locator screw 273b contact the flange 17b of the vane throughout its rocking angle.

Relative to the class surface or W-gage 160, it is evident that its transducer 246 produces an output proportional to the difference in the class face angles of the production vane and master at any given angle of the vane. In this latter regard, consider FIG. 13 wherein it will be observed that the gage plunger 264 assumes one fixed axial position relative to the transducer body 262 when the master 110 is in gaging position in the fixture 102. As noted earlier, the master class surface is then parallel to the fixture baseplate 112. The gage transducer 246 is nulled in this position of the plunger. When the production vane 10 is placed in gaging position in the fixture, the angle of the machined class face 22 of the vane relative to the fixture baseplate 112. If the vane class face is precisely parallel to the baseplate, the plunger 264 will occupy its null position relative to the transparent body 262 and the gage 160 will produce a null output. On the other hand, if the class face of the is disposed at some oblique angle relative to the baseplate, the transducer plunger 264 will be displaced axially from its null position with respect to the transducer body 262 and the gage 160 will produce an output voltage. Accordingly, rotation of the vane 10 through the position in which its class surface 22 parallels the baseplate 112 is signalled by a null output of the gage 160. This null output triggers the computer 104 to read the $\Delta R$, $\Delta S$, and $\Delta T$ outputs and compute the true class value of the vane as mentioned above and described presently.

Figure 16A:
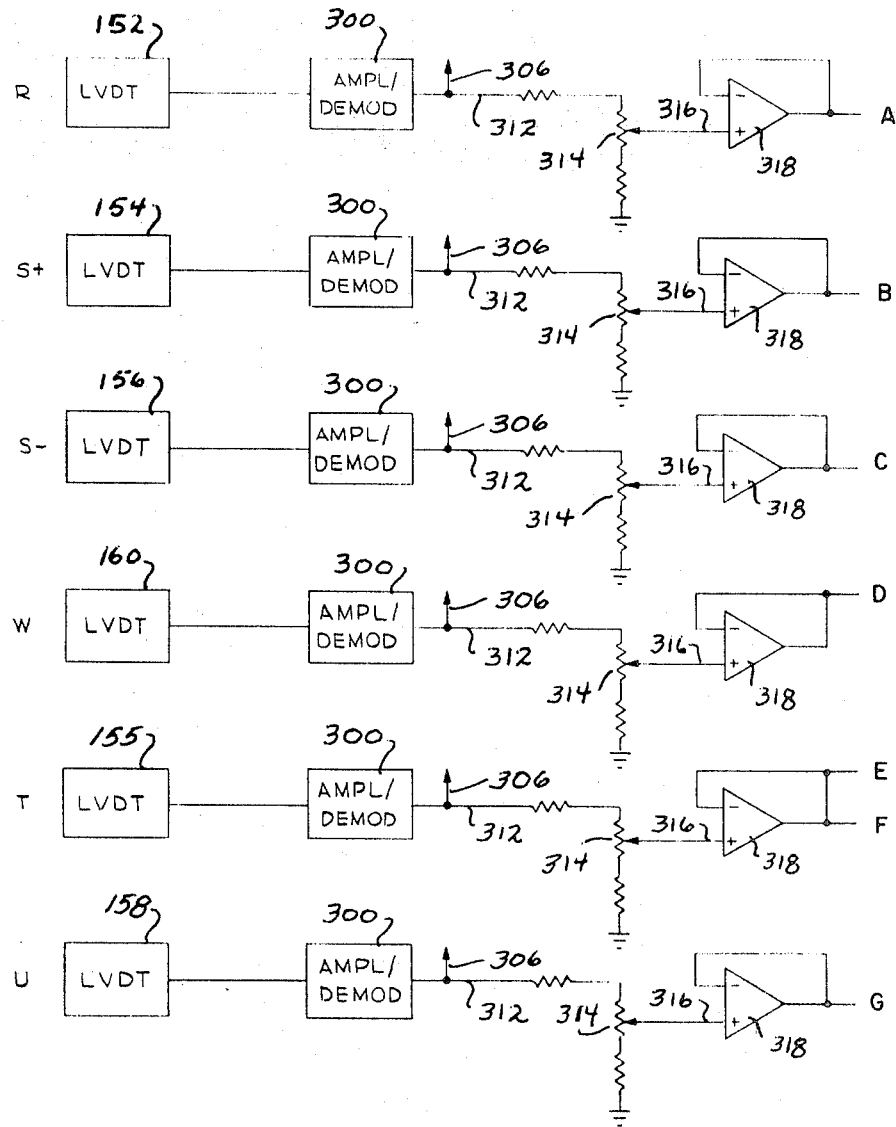
FIG. 16 is a schematic circuit diagram of the computer of the gaging instrument.
Figure 16B:
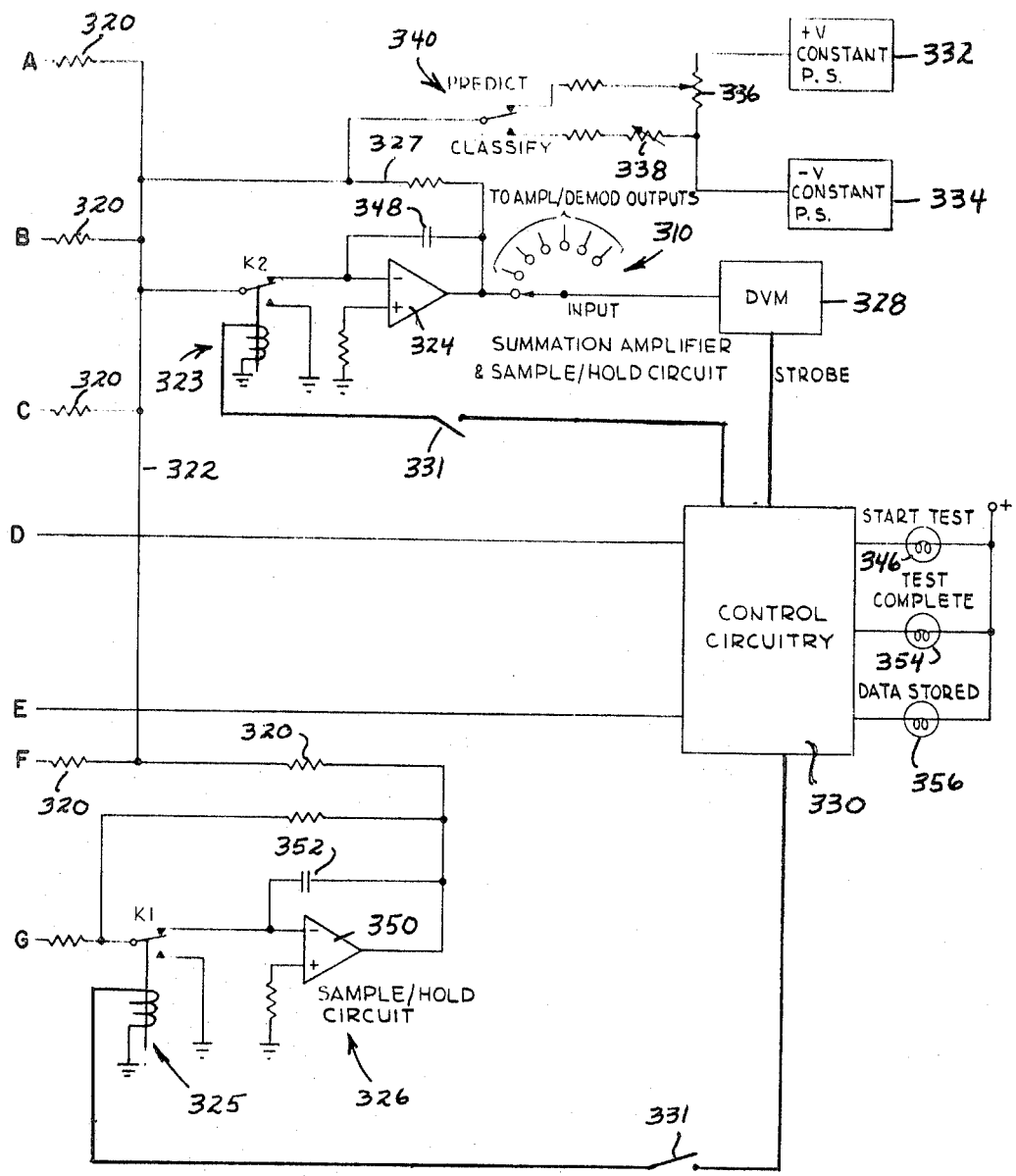

Turning now to FIG. 16, the computer 104 of the gaging instrument includes an amplifier-demodulator 300 connected to the output of the transducer of each fixture gage 152, 154, 155, 156, 158, and 160. The several transducers and amplifier-demodulators are connected through leads of an electrical cable 302 extending between the computer and a terminal box 304 on the rear of the gaging fixture 102. The outputs of the amplifier-demodulators 300 are connected through leads 306 to successive fixed contacts of a rotary selector switch 310 and through leads 312 to corresponding ends of separate voltage dividers 314. Each voltage divider has a tap 316 connected to the input of a buffer amplifier 318. The outputs of the buffer amplifiers for gages 152, 154, 155, and 156 are connected through summing resistors 320, a common lead 322, and a relay 323 to the input of a summing amplifier 324. The output of the buffer amplifier for gage 158 is connected to the summing amplifier through a relay 324, a sample/hold circuit 326, a summing resistor 320, the common lead 322, and the relay 323. The output of the summing amplifier is connected to its input through a feedback circuit 327 and to one fixed contact of the selector switch 310. A readout device 328, such as a digital voltmeter, is connected to the rotary contact of the switch. The outputs of the buffer amplifiers for fixture gages 155, 160 are connected to a control circuit 330 which operates the relays 323, 325 and feed a strobe signal to the voltmeter 328 in response to certain gaging system conditions, as explained shortly. For reasons which will appear from the later description of the control circuit 330, it is necessary during initial operation of the instrument to disconnect the circuit from the relays 323, 325 and to operate the digital voltmeter 328 without the aid of strobing signals from the control circuit. Disconnection of the relays is accomplished by opening relay disconnect switches 331 between the relays and the control circuit. This permits the relays to remain in their illustrated normal positions wherein the upper relay contacts are closed to connect the buffer amplifier outputs to the summing amplifier 324 and to the sample/hold circuit 326. The digital voltmeter used is one having means for switching its operating mode between a self-strobing or internal strobing mode and an external strobing mode. In its internal strobing mode, the voltmeter displays input voltages fed to it through the selector switch 310 without the aid of strobing signals from the control circuit 330. In its external strobing mode, the voltmeter displays input voltages only in response to strobing signals from the control circuit.

Also included in the computer 104 are two fixed DC voltage sources 332, 334. These voltages sources are connected to the summing amplifier 324 through variable resistors 336, 338 and a selector switch 340. Voltage sources 332, 334 produce DC voltages of equal fixed magnitude but opposite polarity.

Electrical power for the computer 104 of the present gaging instrument is furnished by a suitable power source which has been omitted from the drawings for the sake of clarity. This power supply also powers an oscillator which is connected to the center primary windings of the transducers of the several vane gaging 152, 154, 155, 156, 158, and 160 and furnishes the excitation voltages for the transducers.

Turning to FIG. 7 it will be seen that the computer 104 has a housing 344 with a front control panel 346. Switches 310, 331, and 340 have means on the panel by which the switches may be moved to their various positions. Readout device or digital voltmeter 328 has a visual readout display 354 on the panel.

Selector switch 310 has a gaging position and five additional positions which are hereafter referred to as calibration positions. In its gaging position, the switch connects the output of the summing amplifier 324 to the digital voltmeter 328. Rotation of the switch through its calibration positions connects the outputs of the amplifier-demodulators 300 in succession to the voltmeter. Selector switch 340 has predict and classify positions. In its predict position, the switch connects the DC voltage sources 332, 334 to the input of amplifier 324 through resistor 336, hereafter called a predict trim resistor. In its classify position, the switch connects the DC sources to the input of the summing amplifier through the variable resistor 336, hereafter referred to as a class value resistor.

From the foregoing description of the computer 104, it will be understood that the transducers of the vane gages 152, 154, 155, and 156 are connected to the input of the summing amplifier 324 through their respective amplifier-demodulators 300, voltage dividers 314, buffer amplifiers 318, and the common lead 322, the transducer of vane gage 158 is connected to the summing amplifier through its amplifier-demodulator, voltage divider, buffer amplifier, and its sample/hold circuit 326, and the output of the amplifier is connected to the voltmeter 328. Rotation of the selector switch to any one of its five calibration positions connects the output of the amplifier-demodulator 300 for one of the vane gages 152, 154, 155, 156, 158, or 160, depending upon the calibration position, directly to the digital voltmeter 328.

Operation of the gaging instrument involves three basic steps, a first calibration step, a second prediction-gaging step, and a final classification-gaging step. In the initial calibration step, the digital voltmeter 328 is switched to its internal strobing mode and the relay disconnect switches 331 are opened. The master 110 is fixed in any convenient manner in its basic class angle position in the gaging fixture 102. The transducers of the gages 152, 154, 155, 156, 158, and 160 are then nulled in succession by rotating the selector switch 310 to the appropriate calibration positions and adjusting the coil-adjusting or calibration screws 182 of the transducers until the voltmeter 328 registers a null reading. The selector switch 310 is then rotated to its gaging position and the selector switch 340 to its predict position. Under these conditions, the buffer amplifiers 318 for the gages 152, 154, 155, 156, and 158 and the DC sources 332, 334 are connected to the input of the summing amplifier 324 and the output of the summing amplifier is connected to the digital voltmeter 328. The predict trimming resistor 336 is then adjusted to obtain a null reading on the digital voltmeter. This trimming resistor is provided to null out any stray voltages resulting from slight unbalances in the system. At this point, then, the instrument displays a null condition in which the gage transducers all produce null outputs and the digital voltmeter registers a null readout. After completion of the above procedure, the selector switch 340 is placed in its classify position and the class value adjustment resistor 338 is adjusted to obtain on the digital voltmeter a readout equal to the basic class value of the master 110. The calibration step is then completed by switching the voltmeter to its external strobing mode, closing the relay disconnect switches 331, and removing the master from the gaging fixture 102.

In the prediction-gaging mode of the instrument, a production vane 10 with an unmachined class surface is placed in the fixture 102 and the vane is rocked forwardly, i.e. toward the front of the fixture, to a forward limiting or reset position and then rearwardly. From the earlier description of the fixture 102, it will be understood that during this rocking of the vane, the latter rotates in the fixture traps 140 about the trailing edge 34 of the vane and that the transducer plungers of the gages 152, 154, 155, 156, 158, and 160 are retained, by the transducer flexures 174, in yielding contact with and thereby follows the vane through out its range of rocking motion. In other words, the plungers move in and out of their transducer bodies as the vane is rocked back and forth.

Initial forward rotation of the vane 10 is continued through the null position of the T-gage transducer 185 to the forward reset position which is located slightly beyond or forwardly of the latter null position. AS will appear from the later description of the control circuit 330, the output from the T-gage transducer 185 in the reset position triggers the circuit to illuminate a start test lamp 346, indicating to the operator that the reset position has been reached, and resets a digital logic system embodied in the control circuit.

Subsequent rearward rocking of the vane 10 from its forward reset position is continued until the vane rotates back through the null position of the T-gage transducer 185, wherein the transducer produces a null output. In the later description of the control circuit 330, it will be explained that this null signal from the transducer 185 triggers the circuit to operate the relays 323, 325 from their illustrated normal positions, thereby opening the upper relay contacts and closing the lower contacts, and to feed a strobe signal to the digital voltmeter 328. These actions cause the voltmeter to display a figure of merit readout representing the difference in the class values of the master and production vane resulting from the differences, if any, in their R, S, and U dimensions.

In order to understand how this figure of merit readout is produced, consider the conditions which exist at the instant the production vane passes through, i.e. occupies, the T-gage null position referred to above during rearward rocking of the vane from the forward reset position. In this null position, the tip chord section C of the vane is obviously oriented at the same angle relative to the fixture baseplate 112 as was the tip chord section of the master during initial nulling of the instrument with the master fixed in its basic class angle position in the fixture. Accordingly, at the instant the production vane occupies its T-gage null position, the transducers of the R-, S-, and U-gages 152, 154, 156, and 158 produce output voltages representing the differences in the R, S, and U dimensions of the master and vane, i.e. the $\Delta R$, $\Delta S$, and $\Delta U$ dimensions referred to earlier, as measured at the T-gage null position. More specifically, the output voltage of gage 152 represents the $\Delta R$ dimension, the difference in the output voltages of the gages 154, 156 represents the $\Delta S$ dimension, and the output voltage of the gage 158 represents the $\Delta U$ dimension. As will appear from the later description, the above $\Delta R$, $\Delta S$, and $\Delta U$ dimensions constitute the variables of the prediction formula which is used to compute the difference in class values of the master and production vane, i.e. the figure of merit of the vane, in the prediction gaging mode of the instrument.

These gage output voltages are amplified and demodulated in the amplifier-demodulators 300 to produce DC voltages representing the above dimensional deviations $\Delta R$, $\Delta S$, and $\Delta U$ of the production vane at the T-gage null position. The DC voltages from the amplifier-demodulators are applied to the corresponding voltage dividers 314. Each voltage divider is set to produce an output voltage equal to the product of its respective input voltage and a constant determined by the class formula of the vanes being engaged, as explained presently. The output voltages from the voltage dividers are amplified in the buffer amplifiers 300 and applied to the input of the summing amplifier 324 along with the output voltage from the prediction trimming resistor 338. As explained below, the null output from the T-gage 155 at the instant the vane 10 passes through the T-gage null position triggers the control circuit 330 to operate relays 323, 325 and feed a strobe signal to the voltmeter 328. These actions cause the summing amplifier 324 to produce an output voltage proportional to the algebraic sum of the several amplifier input voltages, which output voltage is applied to the digital voltmeter 328, and the voltmeter to display a figure of merit readout representing the difference on the class values of the production vane and master. This figure of merit is converted, with the aid of existing charts or tables, to an angle at which the class face 22 of the production vane must be machined to produce the finished machined vane with a selected class value which may be either that of the master 110 or some other class value.

In connection with the above gaging procedure, it is significant to recall that the production vane 10 does not remain stationary in the T-gage null position, but rather passes through this position during its rearward rocking motion from the forward reset position. Accordingly, the AC output voltages from the gage transducers, and hence the DC voltages fed to the summing amplifier 324 from the buffer amplifiers 318, continuously change and represent the $\Delta R$, $\Delta S$, and $\Delta U$ dimensions of the vane only at the instant of passage of the vane through the T-gage null position. Connected between the output and input of the summing amplifier 324 is a condenser 348 which is continuously charged to the varying input voltage level to the amplifier. The sample/hold circuit 326 for the U-gage 158 includes a summing amplifier 350 whose input is connected to the corresponding buffer amplifier 318 through the upper contact of relay 325 and whose output is connected through the corresponding summing resistor 320 to the common lead 322. Connected across the input and output of the summing amplifier 350 is a condenser 352 which is continuously charged to the varying input voltage level to the amplifier from the U-gage buffer amplifier.

From this description, it will be understood that at the instant of passage of the production vane 10 through the T-gage null position described above, the condensers 348, 352 are charged to the input voltage levels to their respective amplifiers at that instant. The charge on the condenser 352 then represents the product of the $\Delta U$ dimension of the production vane (measured at the T-gage null position) and the class formula constant represented by the setting of the corresponding voltage divider 314. The charge on the condenser 348 represents the sum of the prediction trimming resistor output voltage and the products of the $\Delta R$, $\Delta S$, and $\Delta U$ dimensions (measured at the T-gage null position) and the respective class formula constants represented by the settings of the corresponding voltage dividers 314.

As will appear from the later description of the control circuit 330, the null signal from the T-gage transducer 185 upon rearward rotation of the vane 10 through the T-gage null position triggers the control circuit to operate the relays 323, 325 from their illustrated normal positions, thereby opening the upper relay contacts and closing the lower contacts, and to feed a strobe signal to the digital voltmeter 328. These actions isolate the summing amplifier 324 from the buffer amplifiers 318 and illuminate a test complete lamp 350 to signal completion of the prediction gage step, and actuate the voltmeter to display a reading related to the voltage level of the charge then stored in the summing amplifier condenser 348. This voltage level is obviously equal to the input voltage to the summing amplifier 324 at the instant the vane 10 passes through its T-gage null position. In other words, the summing amplifier 324 and its condenser 348 provide a sample/hold circuit which stores the input voltage sum to the amplifier at the T-gage null position. The digital voltmeter 328, when activated by the strobe signal from the control circuit 330, reads and displays a reading related to this stored voltage sum. As will be explained presently, the voltage sum which is thus stored in the sample/hold circuit 324, 348 in the present prediction gaging mode represents the difference in class values of the master and vane and is displayed as a corresponding numerical figure of merit readout on the voltmeter 328.

It will be understood from the above description of the sample/hold circuit 326 for the U-gage 158 that the latter is isolated from its buffer amplifier 318 upon operation of relay 325 by control circuit 330 at the T-gage null position. This latter sample/hold circuit the operates in essentially the same manner as the sample/hold circuit 324, 348, to store its buffer amplifier input voltage at that instant and feed this stored voltage to the summing amplifier 322 along with the voltages from the buffer amplifiers for the gages 152, 154, and 156.

After being gaged in the manner explained above, the production vane 10 is removed from the gaging fixture 102 and the class surface 22 of the vane is machined to the angle corresponding to the figure of merit readout obtained in the above prediction step and desired class value of the machined vane. In this regard, it will be recalled that the machining angle is obtained from prepared tables or charts which list the proper class face angles for various figures of merit and class values. This conversion of figure of merit to class face angle and the techniques used to machine the vane class face to the resulting angle are well known and do not constitute a part of the present invention. Accordingly, it is unnecessary to discuss the same in the present disclosure.

In the final classification gaging step of the gaging instrument, the master 110 may be replaced in its basic class angle position in the gaging fixture 102 and the mode selector switch 310 stepped through its calibration positions to make certain that the transducers of the vane gages 152, 154, 155, 156, 158, and 160 are still in their null conditions. Any transducer which provides other than a null reading on the voltmeter 328 is renulled in the manner explained earlier. The selector switch 340 is then rotated to its "classify" position and the class value adjustment resistor 338 is adjusted if necessary to obtain on the voltmeter readout display 354 a reading equal to the class value of the master. It will be recalled that these same calibration steps were preformed at the outset of the prediction-gaging step and may be repeated here only to make certain that the settings were not disturbed in the interval between prediction and classification.

At this point, the master 110 is removed and the machined production vane 10 is replaced in the fixture. The vane is then rocked forwardly through the T-gage null position to the forward reset position in the same manner as during prediction gaging. Arrival of the vane at the reset position triggers the control circuit 330 to illuminate the start test lamp 346 and reset the digital logic system in the control circuit, as before. The vane is then rocked rearwardly back through the T-gage null position, again in the same manner as during prediction gaging. In the present classification-gaging step, however, rearward rocking of the vane is continued through the T-gage null position to a rear limiting or data stored position, after which the vane is again rocked forwardly through a test complete position wherein the machined class surface of the vane parallels the fixture baseplate 112.

In the later description of the control circuit 330, it will be seen that rearward rotation of the vane 10 through the T-gage null position in the classification-gaging mode of the instrument operates the relay 325 for the U-gage sample/hold circuit 326 from its illustrated normal position to cause the latter circuit to store the input voltage to the circuit at the instant of passage of the vane through the T-gage null position. As noted earlier, this input voltage and hence stored voltage represents the product of the ΔU dimension of the vane (measured at the T-gage null position) and the class formula constant represented by the setting of the corresponding voltage divider 314. It will also appear from the description of the control circuit 330 that the output of the T-gage transducer 185 in the rear limiting or data stored position of the vane 10 triggers the control circuit to illuminate a data stored lamp 356 to indicate that the rear position has been reached and the ΔU signal has been stored. The latter T-gage transducer output also resets the digital logic system of the control circuit to monitor the output of the W-gage transducer 246, or more accurately, the output of the W-gage buffer amplifier 318.

At this point, it is significant to recall that the W-gage transducer 246 was initially nulled with the master 110 fixed in its basic class angle position in the fixture 102. In this position, the class surface of the master parallels the fixture baseplate 112. Accordingly, a null output from the W-gage transducer when the machined production vane 10 is mounted in the fixture indicates that the class surface of the vane parallels the fixture baseplate.

In the present classification-gaging mode of the instrument, the vane 10 is rocked forwardly from its rear data stored position to the position wherein the W-gage transducer 246 produces a null output indicating that the vane class surface then parallels the fixture baseplate 112. From the later description of the control circuit 330, it will be seen that this null signal from the W-gage transducer triggers the control circuit to operate the summing amplifier relay 323 from its normal position, feed a strobe signal to the digital voltmeter 328, and illuminate the test complete lamp 354. Operation of the relay 323 from its normal position causes the sample/hold circuit 324, 348 to store the input voltage to the circuit at the instant of passage of the vane 10 through the null position of the W-gage transducer 246. The strobe signal to the voltmeter activates the latter to display a reading related to this stored voltage, which reading is the true class value of the machined vane 10.

In connection with the latter operation of the instrument, it is evident that the above input voltage which is stored in the sample/hold circuit 324, 348 in the classification gaging mode of the instrument is the sum of the output voltage from the class value resistor 338, the output voltage from the U-gage buffer amplifier 318 in the T-gage null position of the vane, and the output voltages from the R, S, and T-gage buffer amplifiers in the W-gage null position of the vane. The latter output voltage from the U-gage buffer amplifier represents the product of the ΔU dimension of the vane (measured at the T-gage null position) and the class formula constant represented by the setting of the corresponding voltage divider 314. The latter output voltage from each R, S, and T-gage buffer amplifier represents the product of the corresponding vane delta dimension ΔR, ΔS, or ΔT, as the case may be (measured at the W-gage null position) and the class formula constant represented by the setting of the respective voltage divider.

As will appear from the ensuing description, the above ΔR, ΔS, ΔT, and ΔU dimensions constitute the variables of the classification formula which is used to compute the true class value of the machined production vane in the classification-gaging mode of the instrument. The voltage sum which is stored in the sample/hold circuit 324, 348 in the present classification-gaging mode represents this true class value, and the digital voltmeter 328 displays the stored voltage as the true class value or numerical class designation of the vane.

At this point, it is significant to recall that the present gaging instrument is designed to carry out a turbine vane prediction and classification-gaging procedure involving the use of class formulas that express a figure of merit of a production vane in terms of its $\Delta R$, $\Delta S$, and $\Delta U$ dimensions (measured at the T-gage null position) and the true class value of the production vane in terms of its $\Delta U$ dimension (measured at the T-gage null position) and its $\Delta R$, $\Delta S$, and $\Delta U$ dimensions (measured at the W-gage null position). Before explaining these formulas further, it is helpful to recall the earlier discussion relating to turbine classes. As noted in that discussion, a set of turbine vanes of any given design are adapted for assembly into an annular configuration with the class surfaces of the vanes in seating contact with a mounting or bolting surface to form an annular nozzle ring of given diameter, i.e. inside and outside diameter. Each pair of adjacent vanes defines an intervening throat. The total nozzle ring flow area equals the sum of the several vane throat areas. Viewed in another way, the nozzle ring as a whole presents a given annular area determined by the inner and outer diameters of the ring. This annular area is divided into incremental sectors equal in number to the vanes and each occupied by a vane and its respective throat. The area of each sector equals the annular area of the nozzle ring divided by the number of vanes. In the following discussion, the equal areas of these sectors are referred to as sector areas. The flow area of a vane obviously equals this sector area minus the blocked area of the vane.

As noted in the earlier discussion, turbine vanes may be installed in a nozzle ring in any one of a range of angular positions, by machining the class surfaces of the vanes to the appropriate angles, in order to vary the vane throat areas and hence the total nozzle ring flow area. In this regard, it is apparent that changing the angle of a vane changes its blocked area and thereby its flow area which equals the difference between sector area and blocked area. The different throat areas which are provided by these different angular positions are referred to as classes. Each vane is characterized and designated by its respective class value.

A full range of classes for a particular vane design may include any number of classes which are denoted by the numbers 1, 2, 3,-N. Typically, the number of classes for a given turbine vane design is in the range from 15 to 30. In some cases, the classes are divided into half classes. The delta angle and delta throat angle between successive classes is substantially constant over the entire class range.

It is evident from the foregoing discussion that the numerical class value of a turbine vane is proportional to its flow area and the flow area, in turn, is proportional to the class value. From this it will be understood that the difference in flow area of the master 110 and production vane 10 is proportional to the difference in their numerical class values.

Returning now to the matter of the class formulas, i.e. "figure of merit" or prediction formula, and "true class value" or classification formula, which are used in the present gaging instrument, these formulas are based on known basic class formulas which express the flow areas $A_F$ of turbine vanes in terms of their R, S, U, and T dimensions. While these basic class formulas vary from one vane design to another, they are of the general form:

(1) $A_F = K_1 - K_2 R - K_3 S - K_4 T + K_5 U - K_6$ where $K_1-K_6$ are constants determined by each vane design and the R, S, T, and U dimensions are measured at the class angle of the vane.

The first constant term $K_1$ of the above basic class formula actually represents the sector area allotted to the vane and remaining terms represent the blocked area of the vane. As noted earlier, the difference between the sector area of a vane and its blocked area equals the flow area of the vane.

The prediction and classification formulas which the computer 104 uses to compute the figure of merit of the production vane 10 in the prediction-gaging mode of the present instrument and the true class value of the vane in the classification-gaging mode are derived from the basic formula for the particular vane being gaged. The manner in which these prediction and classification formulas are derived is not essential to an understanding of the invention. Suffice it to say that the prediction formula is of the general form:

(2) $\Delta N = -K_R \Delta R - K_X \Delta S + K_U \Delta U$ where $\Delta N$ is the difference in class values of the master and production vane, i.e. the figure of merit of the vane; $K_R$, $K_S$, and $K_U$ are constants determined by the particular vane design being gaged; and $\Delta R$, $\Delta S$, and $\Delta U$ are the differences in the R, S, and U dimensions of the master and vane as gaged in the present instrument during the prediction gaging mode with the tip chord section C of the vane oriented at the same angle relative to the baseplate 112 as the tip chord section of the master when the latter occupies its basic class angle position in the fixture. In other words, $\Delta R, \Delta S$, and $\Delta U$ are the $\Delta R$, $\Delta S$, and $\Delta U$ dimensions which are gaged in the prediction-gaging mode of the present instrument when the vane rocks through the null position of the T-gage transducer 185.

The classification formula which is used in the present instrument is of the general form:

(3) $N = K_C - K_R \Delta R - K_S \Delta S - K_T \Delta T + K_U \Delta U$ where $N$ is the true class value of the vane; $K_C$ is the basic class value of the master; $K_R$, $K_S$, and $K_U$ are the same constants as in the prediction formula; $K_T$ is another constant determined by the vane design being gaged; $\Delta U$ is the difference in the airfoil length dimensions U of the master and vane as gaged in the present instrument during the classification gaging mode when the vane rocks through the null position of the T-gage transducer 185; and $\Delta R$, $\Delta S$, and $\Delta T$ are the differences in the R-, S-, and T-dimensions of the master and vane as gaged in the present instrument during the classification-gaging mode when the vane rocks through the null position of the W-gage transducer 246.

Referring again to the present gaging instrument, the transducers of the vane gages 152, 154, 155, 156, 158, and 160 are matched to have approximately the same voltage output per unit plunger displacement from the null position. The voltage divider 314 for gage 152 is set to have a ratio equal to the prediction and classification formula constant $K_R$. The voltage dividers for gages 154, 156 are set to have ratios equal to the formula constant $K_S$. Similarly, the voltage dividers for the gages 155 and 158 are set to have ratios equal to the formula constants $K_T$ and $K_U$, respectively. The class value adjustment resistor 336 and the voltage sources 332, 334 provides the master vane class constant $K_C$.

In the operation of the instrument, the vane gage transducers are initially nulled, in the manner explained earlier, with the master 110 fixed in its basic class angle position in the gaging fixture 102. The selector switch 310 is then turned to its gaging position and selector switch to its prediction position and the prediction-trimming resistor 336 is adjusted to obtain a zero reading on the display 354 of the digital voltmeter, as explained earlier. While the master is still in the fixture, the R-, S-, and U-gage transducers 152, 154, 156, and 158 are calibrated by effectively introducing known $\Delta R$, $\Delta S$, and $\Delta U$ dimensions into the instrument, one at a time, and adjusting the gain of the corresponding amplifier-demodulator 300 to provide on the voltmeter 328 the correct figure of merit ($\Delta N$) readout as obtained by computation using the appropriate prediction formula (2). This calibration may be accomplished, for example, by inserting a shim of known thickness between the master 110 and the transducer plunger of each gage and adjusting the gain of the corresponding amplifier-demodulator 300 until the correct figure of merit readout is displayed. After this prediction calibration of the instrument has been accomplished, the latter is calibrated for its classification mode by turning the selector switch 340 to its classify position and then adjusting the class value adjustment resistor 338 to obtain on the digital voltmeter display 354 a readout equal to the numerical class value (basic class value) of the master 110. This adjustment of the resistor 336 serves the twofold purpose of nulling out any stray voltages in the system, as did the trimming resistor 336 in the prediction calibration step, and introducing into the system a voltage representing the class value constant $K_C$ in the classification formula (3) above. In this regard, it will be apparent that with the master 110 in gaging position, the $\Delta R$, $\Delta S$, $\Delta T$, and $\Delta U$ dimensions involved in factors in the classification formula are zero, all of the gage transducer plunger occupy their null position, and therefore, the numerical class value readout on the digital voltmeter 328 should be the basic class value of the master. The T-gage transducer 185 is calibrated in the same manner as explained above in connection with the R-, S-, and U-transducers.

The instrument is now set for its prediction-gaging mode and the production vane 10 is placed in the gaging fixture 102 and rocked as explained earlier. In this mode, the $\Delta R$, $\Delta S$, and $\Delta U$ dimensions of the vane which are used in the prediction formula (2) are gaged, by the vane gages 152, 154, 156, and 158, and the latter produce output voltages representing the respective delta dimensions, as the vane rocks through the T-gage null position. From the description to this point, it is apparent that the computer 104 combines these output voltages according to the particular prediction formula for which the computer is set and the computer voltmeter 328 displays the correct figure of merit $\Delta N$ for the production vane.

The instrument is now set for its classification mode by turning the selector switch 340 to its classify position. If desired, the master 110 may now be replaced in the gaging fixture 102 and the null condition of the gage transducers rechecked, as explained earlier. Thereafter the production vane 10, which is now machined to the predicted class surface angle, is again plated in the gaging fixture and rocked as explained earlier. In the classify mode, the $\Delta R$, $\Delta S$, $\Delta T$, and $\Delta U$ dimensions of the vane which are used in the classification formula (3) are gaged by the vane gages 152, 154, 155, 156, and 158 and the latter produce output voltages proportional to the respective dimensions as the vane rotates first through the T-gage null position ($\Delta U$ dimension gaged and stored) and then through the W-gage null position ($\Delta R$, $\Delta S$, and $\Delta T$ dimensions gaged) as explained earlier. From the description to this point, it is apparent that the computer 104 combines these output voltages and that from the classify constant resistor 336 according to the particular classification formula for which the computer is set and the voltmeter 328 displays the true class, i.e. true numerical class value, of the machined production vane.

It will now be understood that use of the present instrument to gage vanes of different design requires use of different class formulas, i.e. prediction and classification formulas, in the computer 104. To this end, the voltage dividers and resistors of the computer may be adjustable to represent different formula. Alternatively these components may be mounted on a plug-in card (circuit board) which may be inserted into and removed from the computer at will and the instrument may be provided with a number of such plug-in cards, having the proper circuit values for different selected class formulas. Switching from one set of class formulas to another may then be accomplished by merely inserting the proper card into the computer.

Figure 17:
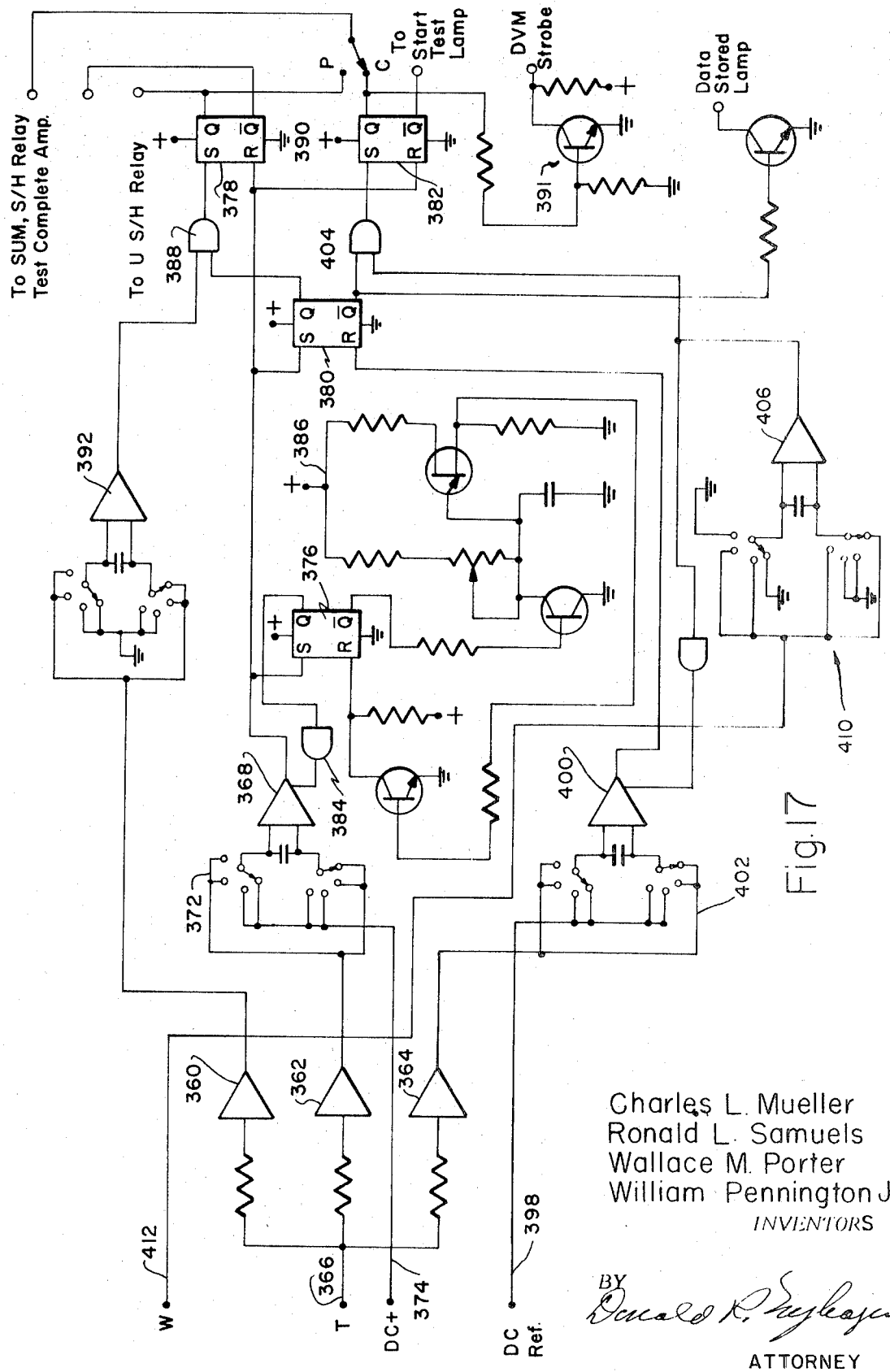
FIG. 17 is a schematic circuit diagram of a logic circuit embodied in the computer.

Turning now to Fig. 17, the control circuit 330 comprises a digital logic system including three buffer amplifiers 360, 362, and 364 whose inputs are connected through a common terminal 366 to the output of the T-gage buffer amplifier 318 and which prevent loading on the T-signal from the latter amplifier. The output of buffer amplifier 362 feeds an integrated reset comparator 368 through contacts of a pair of rotary polarity reversing switches 370, 372. Also connected to the inputs of the comparator 368 through other contacts of the polarity reversing switches 370, 372 is a DC reference voltage source 374. This reference source, which is preferably mounted on the fixture 102 is adjusted to provide a reference voltage slightly less than the T-gage voltage to the comparator 368 when the production vane 10 occupies its forward reset position in the fixture. Accordingly, when the vane is rocked forwardly in the fixture to the reset position during both prediction and classification gaging of the vane, the T-gage signal to the comparator exceeds the reference voltage. Under these conditions, the comparator produces a true output signal which is applied to the set terminals S of the set-reset flip-flops 376, 378 and to the reset terminals R of set-reset flip-flops 380, 382. The true input to flip-flop 376 produces a true output at its Q terminal which is applied to a logic inverter 384, the false output signal from which is applied to the inhibit gate input of the reset comparator 368. This locks out the comparator so that is cannot be accidentally activated to reset the logic before gaging is completed. The true input to the flip-flop 376 also produces a false output at its $\overline{Q}$ terminal which activates a timing circuit 386. This timing circuit then generates a preset time interval approximating or slightly exceeding the true normally required to rock a vane from its reset position, rearwardly to its data stored position, and then forwardly to its end of test or W-gage null position during classification gaging of the vane. At the end of this time interval, the timer applies a true signal to the reset terminal R of the flip-flop 376. The resulting false output from the Q terminal of the flip-flop is inverted to a true signal by the logic inverter which is applied to the inhibit gate input of the reset comparator 368 to condition the latter for resetting the logic at the start of the next gaging operation.

The true signal from the reset comparator 368 to the reset terminal of flip-flop 378 provides a false output at its Q terminal which is connected to the U-gage sample/hold relay 325. This false signal releases the relay for return to its normal position of FIG. 16. The true signal from the reset comparator to the set terminal of flip-flop 380 provides a true output at its Q terminal which is applied to an AND-gate 388 whose output is connected to the set terminal S of the flip-flop 378. As will appear presently, this action conditions the logic system to monitor the T-signal from the T-gage buffer amplifier 318 and to operate the sample/hold relay 325 from its normal position, and thereby store in the sample/hold circuit 326 the $\Delta U$ output from the U-gage buffer amplifier 318, in response to the rocking of the vane 10 through the T-gage null position, as discussed earlier.

Finally, the true signal from the reset comparator 368 to the reset terminal of the flip-flop 382 provides a false output at its Q terminal which is connected, through a switch 390, to the test complete lamp 354, the summation amplifier sample/hold relay 323, a strobe signal generating circuit 391. The true signal to the flip-flop 382 also provides a true output at its $\overline{Q}$ terminal which is connected to the start test lamp 346.

Switch 390, connected between the Q terminal of flip-flop 382 and the test complete lamp 354, has a predict and classify position. Switches 340, 390 are connected for rotating in unison to their respective predict and classify positions. In the predict position of the switch 390, the sample/hold relay 323, test complete lamp 354, and strobe circuit 391 are connected to the Q terminal of flip-flop 378. In the classify position of the switch, the relay, test complete lamp, and strobe circuit 391 are connected to the Q terminal of flip-flop 382.

As noted earlier, in the prediction gaging mode of the instrument, the selector switch 340 (and hence switch 390) is rotated to its predict position and the production vane 10 being gaged is rocked forwardly to its reset position and then rearwardly through the T-gage null position. It will now be understood that forward rocking of the vane to its reset position resets the control circuit logic system, locks the reset comparator 368 in its reset condition for a fixed time interval sufficient to complete prediction gaging, illuminates the start test lamp 346, and conditions the computer 104 to monitor the T-output from the T-gage buffer amplifier 318. It will also be recalled that rotating of the vane to the T-gage null position causes the T-gage transducer 185 to produce a null output. This null output is detected by a T-zero ($T_0$) integrated comparator 392. Control circuit buffer amplifier 360 feeds this comparator through contacts of a polarity reversing switch 394. A zero reference voltage source 396 is also connected to the inputs of the comparator 392 through contacts of the switch 394.

When the vane 10 rocks rearwardly through its T-gage null position during prediction gaging, the null output from the gage activates the $T_0$ comparator 392 to provide a true output. This true signal is applied to the AND-gate 388. It will be recalled that the gate is also currently supplied with a true signal from the flip-flop 380. These two true signals activate the gate to apply a true signal to the set terminal of the flip-flop 378 which is currently in its reset condition. Accordingly, the flip-flop is returned to its set condition, thereby supplying a true signal to the sample/hold relays 323, 325, the test complete lamp 254, and the strobe circuit 391. The relays are thereby operated from their normal positions to store in the summation amplifier sample/hold circuit 324, 348 the combined $\Delta R$, $\Delta S$, and $\Delta U$ and trimming resistor voltage, as explained earlier. The strobe circuit 391 is activated to feed a strobe signal to the voltmeter 328 to cause the latter to display this voltage as the figure of merit of the vane. Finally, the test complete lamp 354 is illuminated to signal completion of prediction gaging.

As noted earlier, during classification gaging, the selector switch 3240 (and hence switch 390) is rotated to its classify position. The machined production vane 10 is rocked forwardly to the reset position, then rearwardly through the T-gage null position to the rear data stored position, and finally forwardly again through the W-gage null or test complete position. Initial rotation of the vane to the reset position resets the control circuit logic in the manner just explained. Following rearward rotation of the vane through the T-gage null position is detected by the $T_0$ comparator 392, also in the manner just explained. However, because the switch 390 is now in its classify position, the test complete lamp 354 remains dark and the strobe circuit 391 remains inactive. The U-gage sample/hold relay 325, however, is operated from its normal position as described above to store the output from the $\Delta U$ buffer amplifier 318 at the T-gage null position.

As the vane 10 rocks rearwardly from the T-gage null position, the output voltage of the T-gage transducer 185 increases and, upon arrival of the vane at the rear data stored position, exceeds a reference voltage provided by a reference voltage source 298. This reference source, like the reference source 374, are preferably mounted on the fixture 102 since their required levels are dependent upon the T-transducer output voltages in the reset and data stored positions and may vary from one fixture to another. Arrival of the vane in the data stored position is detected by an end of travel integrated comparator 400. The inputs of this comparator are connected to the control circuit buffer amplifier 364 and to the reference voltage source 398 through contacts of a polarity reversing switch 402. The reference voltage of source 398 is slightly less than the buffer amplifier T-gage voltage input to the comparator 400 when the vane 10 occupies the data stored position. Accordingly, when the vane arrives at the latter position, the T-signal to the comparator 400 exceeds the reference voltage of source 398. Under these conditions, the comparator provides a true output which is applied to the reset terminal R of the flip-flop 380. This resets the flip-flop to provide a false output at its Q terminal, which inactivates the gate 388 and thereby the $T_0$ zero comparator 392, and a true output at its $\overline{Q}$ terminal which is applied to an AND-gate 404 and to the data stored lamp 356. This lamp is then illuminated to signal the end of travel of the vane 10 and that the $\Delta U$ signal has been stored in the U-gage sample/hold circuit 326.

At this point, the vane is rocked forwardly again toward its W-gage null position. Arrival of the vane at this position is detected by a test complete or W-zero ($W_0$) comparator 406. The inputs of this comparator are connected to the output of the W-gage buffer amplifier 318 and to a zero reference voltage source 408 through a polarity reversing switch 410 and, in the case of the amplifier, also through a terminal 412 of the control circuit. When the W-gage transducer 246 goes through null to signal that the class surface of the vane 10 parallels the fixture baseplate 112, the $W_0$ comparator 406 provides a true output to the AND-gate 404 and to a logic inverter 414 whose output is connected to the inhibit gate input of the end of travel comparator 400. The false signal from the logic inverter to the end of travel comparator locks the latter out. The true signal from the $W_0$ comparator to the gate 404 conditions the latter to provide a true output to the set terminal of the flip-flop 382 which is currently in its reset condition. The flip-flop 382 then provides a true output at its Q terminal which is applied through switch 390 to the summation amplifier sample/hold relay 323, the test complete lamp 354, and the strobe circuit 391. The relay 323 is thereby operated from its normal position to store in the summation amplifier sample/hold circuit 327/348 the combined $\Delta R$, $\Delta S$, $\Delta T$, stored $\Delta U$, and classify constant resistor voltage, as explained earlier. The strobe circuit 391 is activated to deliver a strobe signal to the digital voltmeter 328 for reading and displaying the stored voltage as the true class number of the vane. Finally, test complete lamp 354 is illuminated to signal completion of classification gaging.

In some cases the signs of the class formulas used in the computer may be reversed. The several polarity reversing switches 372, 394, 402, and 410 permit this change in sign to be accommodated by reversing the input connections of their respective comparators. Preferably, the switches are gaged for adjustment in unison.

It is evident at this point that the vane 10 has a prediction-gaging position (T-gage null position) wherein the $\Delta R$, $\Delta S$, and $\Delta U$ dimensions are gaged in the prediction gaging mode. The vane has a first classification gaging position (T-gage null position) wherein the $\Delta U$ dimension is gaged and a second classification-gaging position (W-gage null position) wherein the $\Delta R$, $\Delta S$, and $\Delta T$ dimensions are gaged in the classification-gaging mode. In the particular instrument shown, the vane rocks through these positions and the computer 104 reads the vane dimensions in response to passage of the vane through the various gaging positions. However, it will be immediately obvious that the fixture 102 may be provided with means for stationarily locating the vane in its prediction and classification-gaging position. In this case, the computer 104 need be provided only with means for reading and combining, according to the appropriate prediction and classification formula, the various gage voltages.

What is claimed as new in support of Letters Patent is:

1. A turbine vane-gaging instrument for gaging selected dimensions of a turbine vane comprising:
a gaging fixture including means for supporting said vane in gaging position, and electrical gaging means for gaging said elected dimensions of the vane comprising a number of electrical gages each included a relatively movable element for contacting a selected surface portion of said vane, a relatively stationary element, and means for producing an output voltage representing the relative positions of said elements; and
a computer connected to said gages for combining the gage voltages according to selected class formulas and providing readouts representing the combined voltages.

2. An instrument according to claim 1, wherein:
each said gage also includes means for adjusting the position of its stationary element relative to its movable element along the direction line of relative movement of the respective elements.

3. An instrument according to claim 2 wherein:
said computer also includes means for reading the output voltages of said gages individually.

4. An instrument according to claim 3, wherein:
said vane includes an airfoil having a longitudinal stacking axis, a trailing edge and opposite convex and concave surfaces, and a buttress at one end of said airfoil having a class surface presented laterally of said airfoil axis and confronting shoulder surfaces presented longitudinally of said airfoil;
said selected vane dimensions are R-, S-, U-, and T-dimensions, where said R-, S-, and T-dimensions are effective thickness dimensions of the airfoil chord sections at selected root and center and tip chord stations of said airfoil each measured between and normal to a plane tangent to a selected point on the convex airfoil surface and a plane parallel to said tangent plane and tangent to the concave side of said trailing edge at the respective chord station, and said U-dimension is the distance selected points of said buttress shoulder surfaces; and said gages include an R-gage for gaging said R-dimensions $S_1$ and $S_2$ gages for gaging said S-dimensions, a T-gage for gaging said T-dimension, and a U-gage for gaging said U-dimension.

5. An instrument according to claim 4, wherein:

said computer includes the means for deriving a voltage equal to the product of each gage output voltage, and means for selectively summing the voltages derived from said gages and providing a readout representing the voltage sum.

6. A turbine vane-gaging instrument for gaging selected dimensions of a turbine vane, said vane including an airfoil having a longitudinal stacking axis, a trailing edge and opposite convex and concave surfaces, and a buttress at one end of said airfoil having a class surface presented laterally of said airfoil axis and confronting shoulder surfaces presented longitudinally of said airfoil, and said selected vane dimensions being R-, S-, U-, and T-dimensions, where said R-, S-, and T-dimensions are effective thickness dimensions of the airfoil chord sections at selected root and center and tip chord stations of said airfoil each measured between and normal to a plane tangent to a selected point on the convex airfoil surface and a plane parallel to said tangent plane and tangent to the concave side of said trailing edge at the respective chord station, and said U-dimension is the distance between selected points of said buttress shoulder surfaces, said instrument comprising:

a gaging fixture including means for supporting said vane in gaging position, and electrical gaging means for gaging said selected dimensions of the vane comprising an R-gate for gaging said R-dimension, $S_1$ and $S_2$ gages for gaging said S-dimensions, a T-gage for gaging said T-dimension, and a U-gage for gaging said U-dimension;

each gage including a relatively movable element for contacting a selected surface portion of said vane, a relatively stationary element, means for producing an output voltage representing the relative positions of said elements and means for adjusting the position of said stationary element relative to said movable element along the direction line of relative movement of the respective elements; and a computer connected to said gages and having a prediction-gaging mode and a classification-gaging mode, said computer comprising means for reading out the gage output voltages individually, means for producing a selected constant voltage, and means for combining in said prediction gaging mode the voltages derived from said R, $S_1$, $S_2$, and U-gages according to a selected prediction formula and combining in said classification-gaging mode said constant voltage and the voltages derived from all said gages according to a selected classification formula.

7. An instrument according to claim 6, wherein:

said vane supporting means comprise a pair of root and tip traps located in parallel trap planes for pivotally supporting said vane at its root and tip chord stations on a pivot axis coinciding approximately with said trailing edge;

said gages comprise linear transducers each having a plunger with an axis normal to a selected plane parallel to said pivot axis;

said R-gage plunger has its axis laterally spaced a predetermined distance from said pivot axis and mounts within the plane of said root trap a vane-engaging wheel of predetermined radius;

said $S_1$ gage plunger has its axis laterally spaced a predetermined distance from said pivot axis and mounts within an intermediate plane between and parallel to said trap planes a vane-engaging wheel of predetermined radius;

said $S_2$ gage plunger has its axis intersecting said pivot axis and located in said intermediate plane;

said T-gage plunger has its axis laterally spaced a predetermined distance from said pivot axis and mounts within the plane of said tip trap a vane-engaging wheel of predetermined radius;

said U-gage plunger has its axis normal to said trap planes and includes gage pins on a common axis parallel to the latter plunger axis for engaging said buttress shoulder surface, one gage pin being fixed relative to said fixture, and means operatively connecting the other gage pin to said U-gage plunger for movement with the latter plunger along said common axis;

said vane has a prediction gaging position wherein said tip chord section is oriented at a predetermined angle relative to a reference plane, a first classification-gaging position coinciding with said prediction position, and a second classification-gaging position wherein said class surface parallels said reference plane; and said R, $S_1$, $S_2$, and U-dimensions are gaged in said predication mode with said vane in said prediction position, said U-dimension is gaged in said classification mode with said vane in said first classification position, and said R-, S-, and T-dimensions are gaged in said latter mode with said vane in said second classification position.

8. A turbine vane-gaging instrument for gaging corresponding selected dimensions of a master vane and a production vane comprising:

a gaging fixture including means for supporting each vane in gaging position, and electrical gaging means for gaging said selected dimensions of each vane and producing output voltages representing the difference in the corresponding dimensions of said master vane and production vane; and a computer connected to said gaging means for combining said voltages according to selected class formulas and providing readouts representing the combined voltages.

9. An instrument according to claim 8, wherein:

said electrical gaging means comprise a number of electrical gages each including a relatively movable element for contacting a selected surface portion of said vane, a relatively stationary element, and means for producing an output voltage representing the relative positions of said elements.

10. An instrument according to claim 9, wherein:

each said gage also includes means for adjusting the position of its stationary element relative to its movable element along the directional line of relative movement of the respective elements.

11. An instrument according to claim 10, wherein:

said computer also includes means for reading the output voltages of said gages individually.

12. An instrument according to claim 11, wherein:

each said vane includes an airfoil having a longitudinal stacking axis, a trailing edge and opposite convex and concave surfaces, and a buttress at one end of said airfoil having a class surface presented laterally of said airfoil axis and confronting shoulder surfaces presented longitudinally of said airfoil;

said selected vane dimensions are R-, S-, T-, and U-dimensions, wherein said R-, S-, and T-dimensions are effective thickness dimensions of the airfoil chord sections at selected root, center, and tip chord stations of said airfoil each measured between and normal to a plane tangent to a selected point on the convex airfoil surface and a plane parallel to said tangent plane and tangent to the concave side of said trailing edge at the respective chord station, and said U-dimension is the distance selected points of said buttress shoulder surfaces;

said gages include an R-gage for gaging said R-dimension, $S_1$ and $S_2$ gages for gaging said S-dimension, a T-gage for gaging said T-dimension and a U-gage for gaging said U-dimension.

13. An instrument according to claim 12, wherein:
said computer includes the means for deriving a voltage equal to the product of each gage output voltage, a selected constant, and means for selectively summing the voltages derived from said R, $S_1$, $S_2$, T, and U-gages and providing a readout representing the voltage sum.

14. A turbine vane gaging instrument for gaging selected dimensions of a master vane and a production vane, each vane including an airfoil having a longitudinal stacking axis, a trailing edge and opposite convex and concave surfaces, and a buttress at one end of said airfoil having a class surface presented laterally of said airfoil axis and confronting shoulder surfaces presented longitudinally of said airfoil, and said selected vane dimensions being R-, S-, U-, and T-dimensions, where said R-, S-, and T-dimensions are effective thickness dimensions of the airfoil chord sections at selected root and center and tip chord stations of said airfoil each measured between and normal to a plane tangent to a selected point on the convex airfoil surface and a plane parallel to said tangent plane and tangent to the concave side of said trailing edge at the respective chord station, and said U-dimension is the distance between selected points of said buttress shoulder surfaces, said instrument comprising:
a gaging fixture including means for supporting each vane in gaging position, and electrical gaging means for gaging said selected dimensions of the respective vane comprising an R-gage for gaging said R-dimension, $S_1$ and $S_2$ gages for gaging said S-dimensions, a T-gage for gaging said T-dimension, and a U-gage for gaging said U-dimension;
each gage including a relatively movable element for contacting a selected surface portion of the respective vane, a relatively stationary element, means for producing an output voltage representing the relative positions of said elements, and means for adjusting the position of said stationary element relative to said movable element along the direction line of relative movement of the respective elements whereby said gages may be set with the master vane in the fixture to produce output voltages with the production vane in the fixture representing the difference in the corresponding dimensions of the master and production vanes; and
a computer connected to said gages and having a prediction-gaging mode and classification-gaging mode, said computer comprising means for reading out said gage output voltages individually, means for producing a selected constant voltage, and means for combining in said prediction-gaging mode said output voltages from said R, $S_1$, $S_2$, and U-gages according to a selected prediction formula and combining in said classification-gaging mode said constant voltage and said output voltages from all said gages according to a selected classification formula.

15. An instrument according to claim 14, wherein:
said vane-supporting means comprise a pair of root and tip traps located in parallel trap planes for pivotally supporting each vane at its root and tip chord stations on a pivot axis coinciding approximately with said trailing edge;
said gages comprise linear transducers each having a plunger with an axis normal to a selected plane parallel to said picot axis;
said R-gage plunger has its axis laterally spaced a predetermined distance from said pivot axis and mounts within the plane of said root trap a vane-engaging wheel of predetermined radius;
said $S_1$ gage plunger has its axis laterally spaced a predetermined distance from said pivot axis and mounts within an intermediate plane between and parallel to said trap planes a vane-engaging wheel of predetermined radius;
said $S_2$ gage plunger has its axis intersecting said pivot axis and located in said intermediate plane;
said T-gage plunger has its axis laterally spaced a predetermined distance from said pivot axis and mounts within the plane of said tip trap a vane-engaging wheel of predetermined radius;
said U-gage plunger has its axis normal to said trap planes and includes gage pins on a common axis parallel to the latter plunger axis for engaging said buttress shoulder surface, one gage pin being fixed relative to said fixture, and means operatively connecting with other page pin to said U-gage plunger for movement with the latter plunger along said common axis;
said vane has a prediction-gaging position wherein said tip chord section is oriented at a predetermined angle relative to a reference plane, a first classification-gaging position coinciding with said prediction position, and a second classification-gaging position wherein said class surface parallels said reference plane; and
said R, $S_1$, $S_2$ and U-dimensions are gaged in said prediction mode with said vane in said prediction position, said U-dimension is gaged in said classification mode with said vane in said first classification position, and said R-, S-, and T-dimensions are gaged in said latter mode with said vane in said second classification position.

16. A gaging fixture for a turbine vane-gaging instrument comprising:
means for supporting said vane in gaging position; and
electrical gaging means for gaging selected dimensions of said vane including a number of separate electrical gages, each having a relatively movable element for contacting a selected surface portion of said vane, a relatively stationary element, and means for producing an output voltage representing the relative positions of said elements.

17. A fixture according to claim 16, wherein:
each said gage also includes means for adjusting the position of its stationary element relative to its movable element along the direction line of relative movement of the respective elements.

18. A fixture according to claim 17, wherein:
said vane includes an airfoil having a longitudinal stacking axis, a trailing edge and opposite convex and concave surfaces, and a buttress at one end of said airfoil having a class surface presented laterally of said airfoil and confronting shoulder surfaces presented longitudinally of said airfoil;
said selected vane dimensions are R-, S-, T-, and U-dimensions, where said R-, S-, and T-dimensions are effective thickness dimensions of the airfoil chord sections at selected root, center, and tip chord stations of said airfoil each measured between and normal to a plane tangent to a selected point on the convex airfoil surface and a plane parallel to said tangent plane and tangent to the concave side of said trailing edge at the respective chord station, and said U-dimension is the distance selected points of said buttress shoulder surfaces; and
said gages include an R-gage for gaging said R-dimension, $S_1$ and $S_2$ gages for gaging said S-dimension, a T-gage for gaging said T-dimension, and a U-gage for gaging said U-dimension.

19. A gaging fixture for gaging selected dimensions of a master vane and a production vane comprising:
means for supporting said vanes in gaging position; and
electrical gaging means for gaging said selected dimensions of said vanes and producing output voltages proportional to the difference in the respective dimensions.

20. A turbine vane gaging method which comprises the steps of:
gaging selected corresponding dimensions of a master vane and a production vane and generating voltages proportional to the differences in the corresponding gaged dimensions of the vanes; and
summing said voltages in accordance with a selected class formula and producing a readout representing the summed voltages.

21. The gaging method of claim 20, wherein:

each vane has an airfoil and a class surface;

said selected dimensions are selected dimensions of said vane airfoil;

said class formula is a prediction formula expressing the difference in the class values of said vanes in terms of the differences on said selected dimensions; and said readout is a figure of merit representing said difference in class values.

22. A turbine vane-gaging method involving a master vane and a production vane each having an airfoil and a class surface, comprising:

gaging selected corresponding dimensions of the master vane and production vane airfoils and generating voltages proportional to the differences in the corresponding gaged dimensions of the vanes;

summing said voltages in accordance with a prediction formula expressing the difference in the class values of said vanes in terms of the differences on said selected dimensions and production a readout representing a figure of merit which is related to said difference in class values and may be converted to a predicted angle at which said production vane class surface must be machined to provide said production vane with a selected class value; and gaging said selected airfoil dimensions and corresponding selected class surface dimensions of said vanes after machining of said production vane class surface to said predicted angle, generating output voltages proportional to the differences in the corresponding gaged dimensions, summing the latter voltages in accordance with a selected classification formula expressing the true class value of said production vane in terms of the latter dimensional differences, and producing a readout representing said true class value.

\* \* \* \* \*